US012675827B2

(12) United States Patent
Call et al.

(10) Patent No.: US 12,675,827 B2
(45) Date of Patent: ***Jul. 7, 2026

(54) BLOCKCHAIN SUBROGATION CLAIMS WITH ARBITRATION

(71) Applicant: STATE FARM MUTUAL AUTOMOBILE INSURANCE COMPANY, Bloomington, IL (US)

(72) Inventors: Shawn M. Call, Bloomington, IL (US); Jaime Skaggs, Chenoa, IL (US); Eric Bellas, Bloomington, IL (US); Douglas A. Graff, Mountain View, MO (US); William J. Leise, Normal, IL (US); Vicki King, Bloomington, IL (US); Jacob J. Alt, Downs, IL (US); Eric R. Moore, Heyworth, IL (US); Stacie A. McCullough, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/882,071

(22) Filed: Sep. 11, 2024

(65) Prior Publication Data

US 2025/0005679 A1 Jan. 2, 2025

Related U.S. Application Data

(63) Continuation of application No. 18/206,899, filed on Jun. 7, 2023, now Pat. No. 12,106,380, which is a
(Continued)

(51) Int. Cl.
| *G06Q 40/08* | (2012.01) |
| *G06Q 20/06* | (2012.01) |
| *H04L 9/00* | (2022.01) |

(52) U.S. Cl.
CPC ......... *G06Q 40/08* (2013.01); *G06Q 20/0655* (2013.01); *G06Q 2220/00* (2013.01); *H04L 9/50* (2022.05)

(58) Field of Classification Search
CPC ........................... G06Q 40/08; G06Q 2220/00
See application file for complete search history.

(56) References Cited

U.S. PATENT DOCUMENTS

| 7,739,133 B1 | 6/2010 | Hail et al. |
| 7,962,385 B2 | 6/2011 | Falk et al. |
| | (Continued) | |

FOREIGN PATENT DOCUMENTS

| AU | 2009212995 | 3/2010 |
| AU | 2009212995 A1 | 3/2010 |
| | (Continued) | |

OTHER PUBLICATIONS

Semenovich, in "Blockchain, smart contracts, and their potential insurance application," in Actuaries Institute General Insurance Seminar, (Year: 2016).*
(Continued)

*Primary Examiner* — Mike Anderson
*Assistant Examiner* — Brandon M Duck
(74) *Attorney, Agent, or Firm* — MARSHALL, GERSTEIN & BORUN LLP

(57) ABSTRACT

A shared ledger operated by a group of network participants according to a set of consensus rules manages and resolves subrogation claims between a clamant and a defendant with arbitration. Evidence regarding the value of the subrogation claim is sent to the shared ledger by the parties to the subrogation claim, such as sending data to a smart contract deployed on the shared ledger. The parties to the claim may request arbitration, especially after attempts to settle the claim on-chain between the two parties have failed. An
(Continued)

arbitrator may request evidence from the parties and/or request responses from the parties to accept damages calculations and/or settlement offers. Once the claim is resolved, the arbitrator may release funds on the chain to the prevailing party or may accept confirmation that any payments have been made between the parties off-chain.

20 Claims, 13 Drawing Sheets

Related U.S. Application Data continuation of application No. 17/583,497, filed on Jan. 25, 2022, now Pat. No. 11,710,190, which is a continuation of application No. 15/955,180, filed on Apr. 17, 2018, now Pat. No. 11,270,383.

(60) Provisional application No. 62/584,424, filed on Nov. 10, 2017, provisional application No. 62/584,364, filed on Nov. 10, 2017, provisional application No. 62/584,435, filed on Nov. 10, 2017, provisional application No. 62/555,177, filed on Sep. 7, 2017, provisional application No. 62/555,174, filed on Sep. 7, 2017, provisional application No. 62/555,002, filed on Sep. 6, 2017, provisional application No. 62/555,014, filed on Sep. 6, 2017, provisional application No. 62/510,664, filed on May 24, 2017.

(56) References Cited

U.S. PATENT DOCUMENTS

| | | | |
|---|---|---|---|
| 8,706,586 | B2 | 4/2014 | Rojewski et al. |
| 8,781,863 | B2 | 7/2014 | Hogan et al. |
| 8,799,034 | B1 | 8/2014 | Brandmaier et al. |
| 9,508,200 | B1 | 11/2016 | Mullen et al. |
| 10,454,878 | B2 | 10/2019 | Khan et al. |
| 10,521,780 | B1 | 12/2019 | Hopkins, III et al. |
| 10,586,062 | B1 | 3/2020 | Rangan et al. |
| 10,606,669 | B2 | 3/2020 | Jacobs et al. |
| 10,796,393 | B2 | 10/2020 | Messerges et al. |
| 10,805,085 | B1 | 10/2020 | Liang |
| 10,812,255 | B2 | 10/2020 | Li |
| 10,824,759 | B1 | 11/2020 | Magerkurth et al. |
| 10,833,843 | B1 | 11/2020 | Vijayvergia et al. |
| 10,872,381 | B1 | 12/2020 | Leise et al. |
| 10,878,512 | B1 | 12/2020 | Al-Zoubi et al. |
| 10,891,694 | B1 | 1/2021 | Leise et al. |
| 10,949,926 | B1 | 3/2021 | Call et al. |
| 10,963,966 | B1 | 3/2021 | Brandmaier et al. |
| 11,100,477 | B1 | 8/2021 | Kemper et al. |
| 11,270,383 | B1 | 3/2022 | Call et al. |
| 2003/0028404 | A1 | 2/2003 | Herron et al. |
| 2005/0086180 | A1 | 4/2005 | Wamsley et al. |
| 2006/0089895 | A1 | 4/2006 | Joye et al. |
| 2006/0116914 | A1 | 6/2006 | Stemple |
| 2007/0185743 | A1 | 8/2007 | Jinks |
| 2008/0071664 | A1 | 3/2008 | Silverman et al. |
| 2008/0235064 | A1 | 9/2008 | Gulko et al. |
| 2008/0243556 | A1 | 10/2008 | Hogan et al. |
| 2011/0178906 | A1 | 7/2011 | Joye et al. |
| 2011/0320226 | A1 | 12/2011 | Graziano et al. |
| 2012/0136780 | A1 | 5/2012 | El-Awady et al. |
| 2012/0239417 | A1 | 9/2012 | Pourfallah et al. |
| 2013/0304517 | A1 | 11/2013 | Florence |
| 2014/0108057 | A1 | 4/2014 | Daniels et al. |
| 2014/0229206 | A1 | 8/2014 | Rojewski et al. |
| 2014/0379361 | A1 | 12/2014 | Mahadkar et al. |
| 2015/0046188 | A1 | 2/2015 | De La Garza |
| 2016/0125386 | A1 | 5/2016 | Desai et al. |
| 2016/0125546 | A1* | 5/2016 | Bostic .................... G06Q 40/08 |
| 2016/0217258 | A1 | 7/2016 | Pitroda et al. |
| 2016/0253663 | A1 | 9/2016 | Clark et al. |

| | | | |
|---|---|---|---|
| 2016/0292672 | A1 | 10/2016 | Fay et al. |
| 2017/0161827 | A1 | 6/2017 | Imrey et al. |
| 2017/0186057 | A1 | 6/2017 | Metnick |
| 2017/0232300 | A1 | 8/2017 | Tran et al. |
| 2017/0243212 | A1 | 8/2017 | Castinado et al. |
| 2017/0308893 | A1 | 10/2017 | Saraniecki |
| 2017/0352012 | A1* | 12/2017 | Hearn .................... G06Q 20/06 |
| 2017/0372432 | A1 | 12/2017 | McKown |
| 2018/0025334 | A1 | 1/2018 | Pourfallah et al. |
| 2018/0025442 | A1 | 1/2018 | Isaacson et al. |
| 2018/0046992 | A1 | 2/2018 | Hanrahan et al. |
| 2018/0053257 | A1 | 2/2018 | Nelemans |
| 2018/0091316 | A1 | 3/2018 | Stradling et al. |
| 2018/0117447 | A1 | 5/2018 | Tran et al. |
| 2018/0218343 | A1 | 8/2018 | Kolb et al. |
| 2018/0218455 | A1 | 8/2018 | Kolb et al. |
| 2018/0365684 | A1 | 12/2018 | Reilly et al. |
| 2019/0019186 | A1 | 1/2019 | Falah et al. |
| 2019/0026821 | A1 | 1/2019 | Bathen et al. |
| 2019/0080325 | A1 | 3/2019 | Pourfallah et al. |
| 2019/0102736 | A1 | 4/2019 | Hudson |
| 2019/0191284 | A1 | 6/2019 | Tran et al. |
| 2019/0197620 | A1 | 6/2019 | Jayaram et al. |
| 2019/0354966 | A1 | 11/2019 | Himura et al. |
| 2019/0392437 | A1 | 12/2019 | Castagna et al. |
| 2019/0392438 | A1 | 12/2019 | Rice |
| 2020/0058071 | A1 | 2/2020 | Yang |
| 2020/0065763 | A1 | 2/2020 | Rosinzonsky et al. |
| 2020/0177373 | A1 | 6/2020 | Komandur et al. |
| 2020/0226677 | A1 | 7/2020 | Dhawan et al. |
| 2020/0250753 | A1 | 8/2020 | Blount |
| 2020/0272966 | A1 | 8/2020 | Kirkegaard |
| 2020/0279328 | A1 | 9/2020 | Zhiri et al. |
| 2020/0341971 | A1 | 10/2020 | Krishnaswamy et al. |
| 2020/0394321 | A1 | 12/2020 | Ramos et al. |
| 2020/0394322 | A1 | 12/2020 | Ramos et al. |
| 2020/0409937 | A1 | 12/2020 | Wang et al. |
| 2021/0065293 | A1 | 3/2021 | Sigler et al. |
| 2021/0090037 | A1 | 3/2021 | Dowding |
| 2021/0174442 | A1 | 6/2021 | Trudeau et al. |

FOREIGN PATENT DOCUMENTS

| | | | | |
|---|---|---|---|---|
| WO | 2004044696 | | 5/2004 | |
| WO | WO-2004044696 | A2 | 5/2004 | |
| WO | WO 20171577449 | * | 9/2017 | ............. G06Q 40/08 |
| WO | WO-2018106187 | A1 | 6/2018 | |
| WO | 2018232493 | | 12/2018 | |
| WO | WO-2018232493 | A1 | 12/2018 | |
| WO | 2021/046494 | | 3/2021 | |
| WO | WO-2021/046494 | A1 | 3/2021 | |

OTHER PUBLICATIONS

"Blockchain",Wikpedia, (2019).

"Managing Terrorism Financing Risk in Remittances and Money Transfers", Testimony by John Cassara on Jul. 18, 2017, 17 pages.

"The Blockchain Imperative: The Next Challenge for P&C Carriers" published in Cognizant, Nov. 2016, 20 pages.

"The Blockchain Imperative: The Next Challenge for P&C Carriers", published in Cognizant, Nov. 2016.

"The Hawala Alternative Remittance System and Its Role in Money Laundering", by Jost and Sandhu, published in Jan. 2000, 27 pages.

Aru, "HashCoin uses Emercoin Blockchain for Vehicle Registration," Dec. 8, 2016, <https://cointelegraph.com/news/hashcoin-uses-emercoin-blockchain-for-vehicle-registration-and-tracking>.

Chichester, Wide Open Spaces: How Blockchains Have Moved Beyond Currency, The Computer & Internet Lawyer (Aug. 2017).

Dizman, Beyond cryptocurrency: the role of blockchain in the future. ERP and Blockchain Integration, Thesis, Centria University of Applied Sciences, Bachelor of Business Administration, Business Management (Sep. 2021).

Hassan et al., Secured Insurance Framework Using Blockchain and Smart Contract, Scientific Programming, vol. 2021, Article ID 6787406, 11 pages (2021).

PWC, "Blockchain in the Insurance Sector," Dec. 22, 2016, <https://

(56) References Cited

OTHER PUBLICATIONS www.the-digital-insurer.com/wp-content/uploads/2016/12/795-blockchain-in-insurance.pdf>.

Report of the US Secretary of Tresury to US Congress, Nov. 2002, 47 pages.

Report to US Congess submitted by US Tresury Secretray, Board of Governors of the Federal Reserve System, and the Securities and Exchange Commission, on Dec. 31, 2002, 40 pages.

Semenovich, Blockchain, smart contracts and their potential insurance applications, Actuaries Institute, General Insurance Seminar, 2016.

Thompson, "Misplaced Blame: Islam, Terrorism and the Origins of Hawala", published in 2007, Max Planck UN Year Book vol. 11, 28 pages.

U.S. Appl. No. 15/955,180, Call et al., "Blockchain Subrogation Claims With Arbitration", filed Apr. 17, 2018.

U.S. Appl. No. 15/955,180, Final Office Action, dated May 21, 2020.

U.S. Appl. No. 15/955,180, Final Office Action, dated Sep. 22, 2021.

U.S. Appl. No. 15/955,180, Nonfinal Office Action, dated Jan. 30, 2020.

U.S. Appl. No. 15/955,180, Nonfinal Office Action, mailed Feb. 10, 2021.

U.S. Appl. No. 15/955,180, Notice of Allowance, dated Dec. 27, 2021.

U.S. Appl. No. 15/955,213, Call et al., "Fault Determination of Blockchain Subrogation Claims", filed Apr. 17, 2018.

U.S. Appl. No. 15/955,213, Final Office Action, dated Jun. 1, 2020.

U.S. Appl. No. 15/955,213, Nonfinal Office Action, dated Nov. 25, 2019.

U.S. Appl. No. 15/955,213, Nonfinal Office Action, dated Oct. 14, 2020.

U.S. Appl. No. 15/955,213, Notice of Allowance, dated Jan. 8, 2021.

U.S. Appl. No. 15/972,980, Final Office Action, dated Aug. 19, 2020.

U.S. Appl. No. 15/972,980, Final Office Action, dated Jul. 13, 2022.

U.S. Appl. No. 15/972,980, Nonfinal Office Action, dated Feb. 3, 2022.

U.S. Appl. No. 15/972,980, Nonfinal Office Action, dated Mar. 2, 2020.

U.S. Appl. No. 15/972,980, Skaggs et al., "Blockchain Subrogation Payments", filed May 7, 2018.

U.S. Appl. No. 17/168,024, Nonfinal Office Action, dated May 9, 2022.

U.S. Appl. No. 17/168,024, Notice of Allowance, dated Aug. 19, 2022.

U.S. Appl. No. 17/238,546, Final Office Action, dated Mar. 23, 2022.

U.S. Appl. No. 17/238,546, Nonfinal Office Action, dated Nov. 19, 2021.

Yuan et al., Toward biochain based intelligent transportation systems, 2016 IEEE Conference, Nov. 2016.

U.S. Appl. No. 17/583,497, Nonfinal Office Action, dated Sep. 9, 2022.

U.S. Appl. No. 17/583,497, NonFinal Office Action, dated Feb. 9, 2023.

Office Action for U.S. Appl. No. 17/238,546 dated Mar. 23, 2022.

Office Action for U.S. Appl. No. 17/238,546 dated Nov. 19, 2021.

U.S. Appl. No. 17/963,293, NonFinal Office Action, dated May 11, 2023.

Office Action for U.S. Appl. No. 18/238,765 dated May 9, 2024.

Office Action for U.S. Appl. No. 18/206,899, filed Feb. 7, 2024.

* cited by examiner

200

Figure 5:
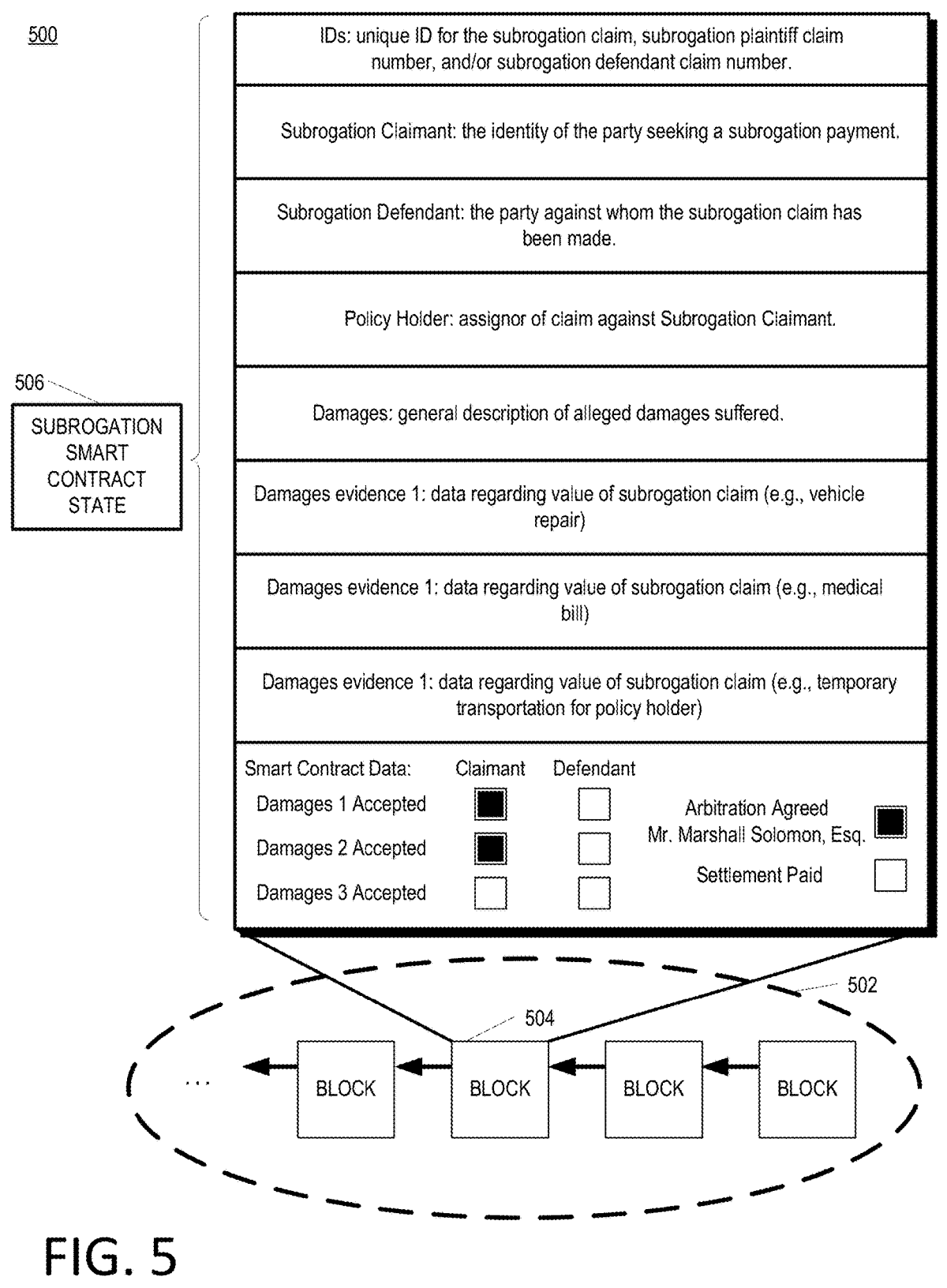

500

506

SUBROGATION
SMART
CONTRACT
STATE

IDs: unique ID for the subrogation claim, subrogation plaintiff claim number, and/or subrogation defendant claim number.

Subrogation Claimant: the identity of the party seeking a subrogation payment.

Subrogation Defendant: the party against whom the subrogation claim has been made.

Policy Holder: assignor of claim against Subrogation Claimant.

Damages: general description of alleged damages suffered.

Damages evidence 1: data regarding value of subrogation claim (e.g., vehicle repair)

Damages evidence 1: data regarding value of subrogation claim (e.g., medical bill)

Damages evidence 1: data regarding value of subrogation claim (e.g., temporary transportation for policy holder)

| Smart Contract Data: | Claimant | Defendant | | |
|---|---|---|---|---|
| Damages 1 Accepted | ■ | ☐ | Arbitration Agreed | ■ |
| Damages 2 Accepted | ■ | ☐ | Mr. Marshall Solomon, Esq. | |
| Damages 3 Accepted | ☐ | ☐ | Settlement Paid | ☐ |

502

504

··· ← BLOCK ← BLOCK ← BLOCK ← BLOCK

Transaction ID: unique ID for this transaction

Subrogation Contract ID: the ID of the subrogation smart contract to which this transaction is sending data.

Originator: identity of entity sending data to the subrogation smart contract.

Damages 1: adds data regarding repair of damage to covered property to smart contract state.

Smart Contract Data:

+ Damages 1 Evidence: evidence of damage to and repair of covered property.

+ Damages 1 Cost: evidence of price charged for repair of covered property.

+ 3rd Party: identity of proposed party source of information.

+ Arbitration Schedule: establish and/or amend arbitration deadlines.

+ Arbitration Decision: decision on damages, liability, and/or dispute.

606

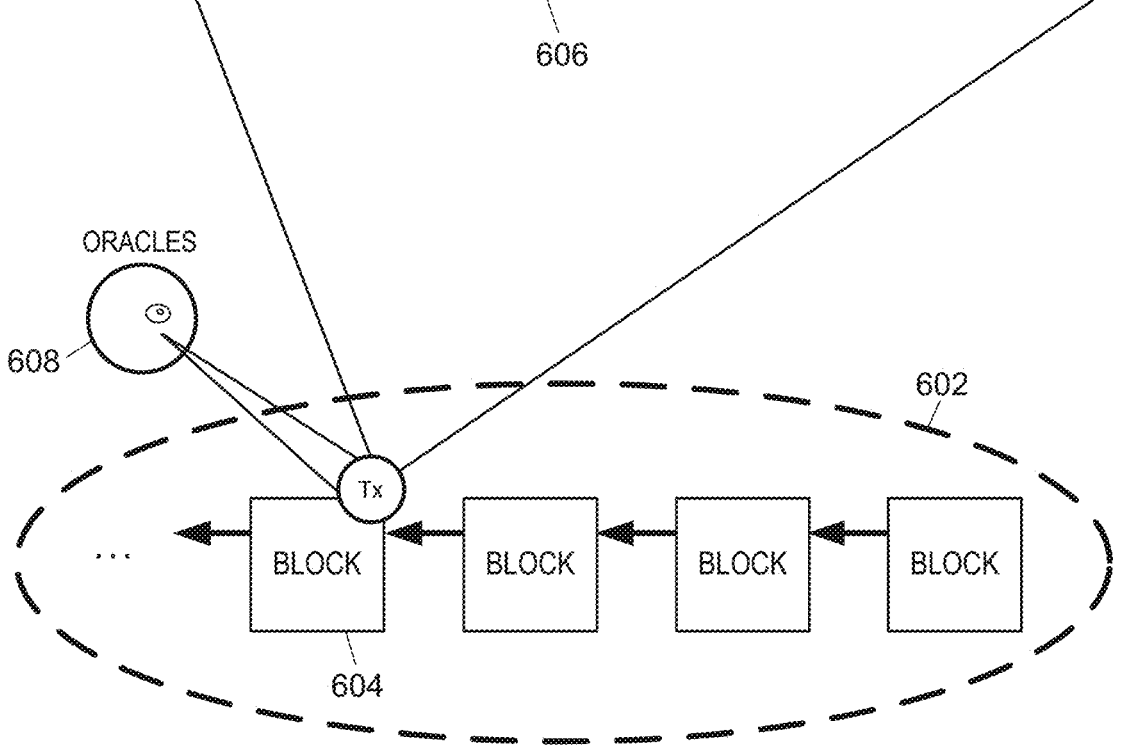

ORACLES

608

602

Tx

... BLOCK BLOCK BLOCK BLOCK

Arbitration Claim ID: unique ID for this arbitration dispute

Subrogation Contract ID: the ID of the subrogation smart contract to which this transaction is sending data.

Originator: identity of entity sending data to the subrogation smart contract.

Smart Contract Data:

+ Vehicle Registration Information: record of vehicle registration.

+ Vehicle Configuration Data: make/model, year, color, options, etc.

+ Vehicle Insurance Data: insurer, insurance coverage level, etc.

+ 3rd Party: identity of proposed party source of information.

706

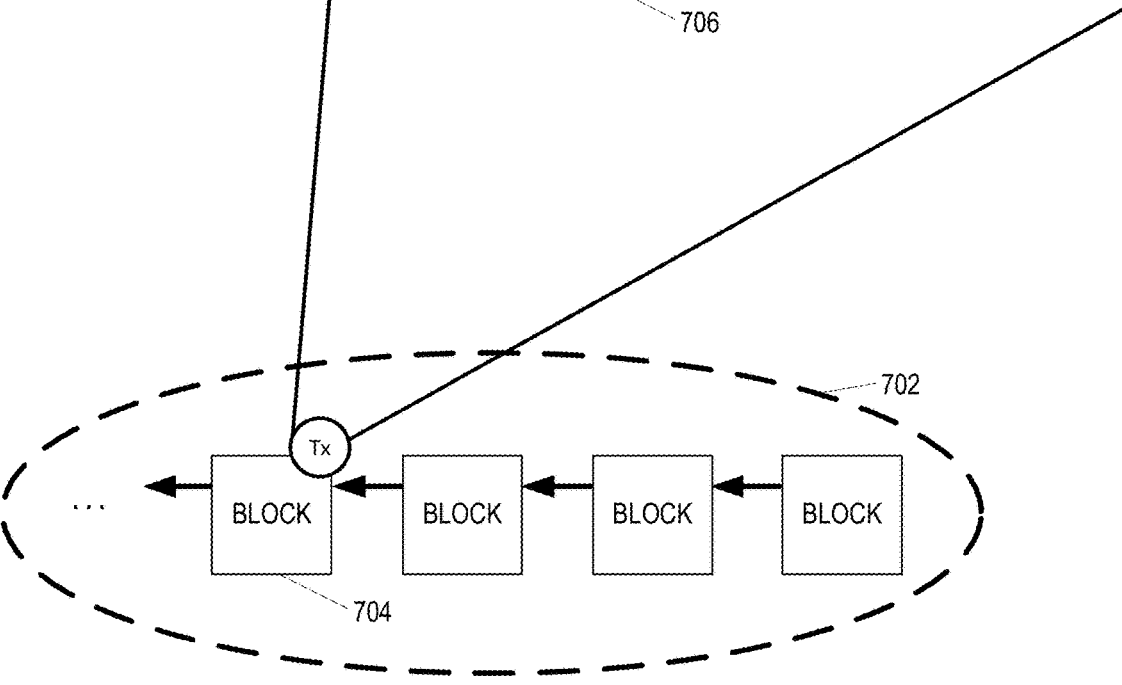

702

Tx

··· BLOCK ← BLOCK ← BLOCK ← BLOCK

Transaction ID:
093f4f73682d37aa0f5283accfe91ff933daffec
eecdf7516e92ee31f42d2d05

Arbitration Claim ID: 50777cqjvlbb2vhbb49I

Damages Approval: [0001] / [signed message]

1006

BLOCK 100 6

BLOCK 100 4

BLOCK

BLOCK

BLOCK

BLOCK

BLOCK 100 2

1000

Tx

Request to Approve Damages

1010

CLAIMANT INSURER

1008

DEFENDANT INSURER

1012

Request to Approve Damages

1016

ARBITRATOR

1014

1200

1202 — Pay a claim for an insured loss.

1204 — Deploy a subrogation claim to a shared ledger including a demand for arbitration.

1206 — Broadcast an update to the subrogation claim deployed to the shared ledger 1208 — Receive a subrogation claim settlement payment upon resolution of the subrogation claim.

1300

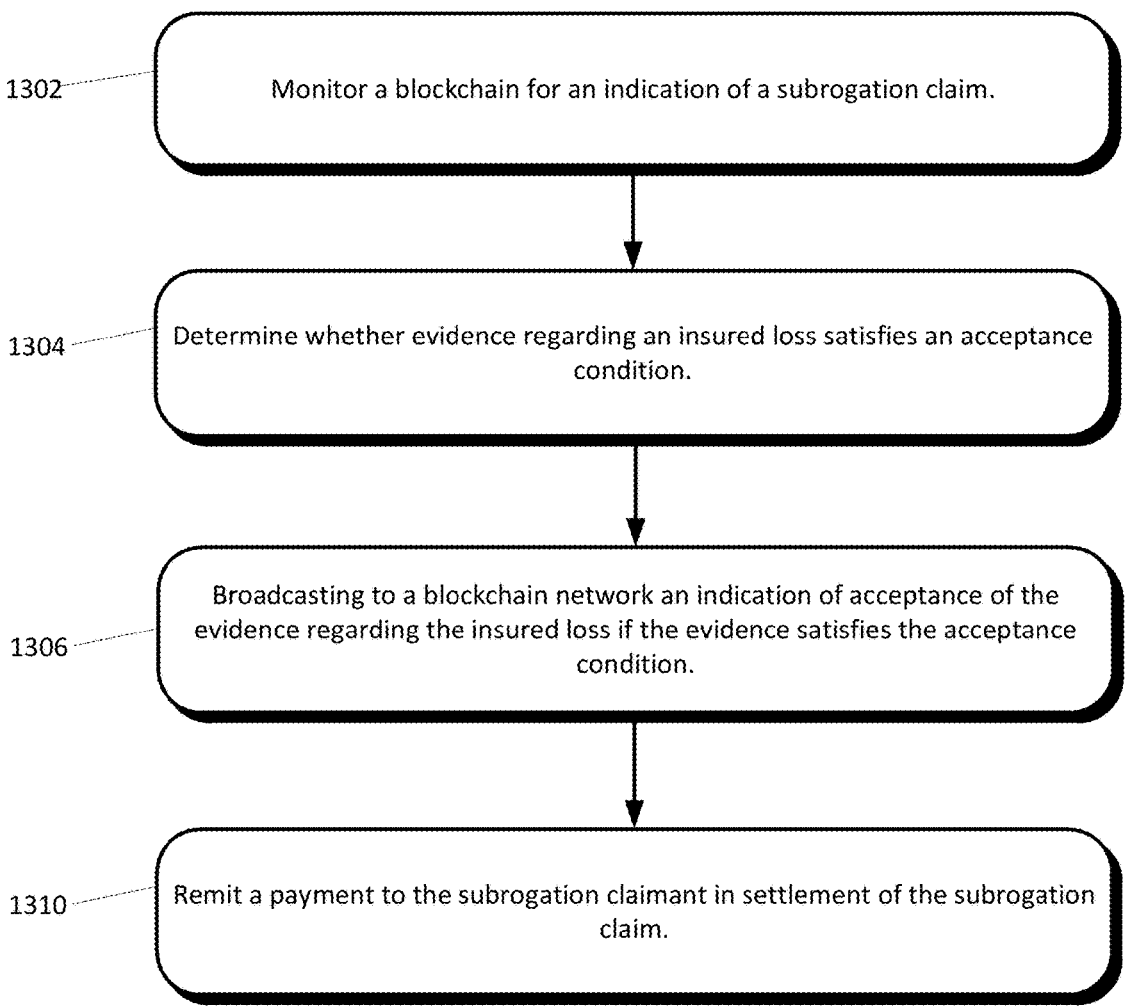

1302 — Monitor a blockchain for an indication of a subrogation claim.

1304 — Determine whether evidence regarding an insured loss satisfies an acceptance condition.

1306 — Broadcasting to a blockchain network an indication of acceptance of the evidence regarding the insured loss if the evidence satisfies the acceptance condition.

1310 — Remit a payment to the subrogation claimant in settlement of the subrogation claim.

FIG. 13

BLOCKCHAIN SUBROGATION CLAIMS WITH ARBITRATION

CROSS-REFERENCE TO RELATED APPLICATIONS

The present application is a continuation of U.S. patent application Ser. No. 18/206,899 entitled "Blockchain Subrogation Claims with Arbitration," filed on Jun. 7, 2023, which is a continuation of U.S. patent application Ser. No. 17/583,497 entitled "Blockchain Subrogation Claims with Arbitration," filed on Jan. 25, 2022, which is a continuation of U.S. patent application Ser. No. 15/955,180 entitled "Blockchain Subrogation Claims with Arbitration," filed on Apr. 17, 2018, which claims priority to U.S. Application No. 62/584,364, filed Nov. 10, 2017; U.S. Application No. 62/584,424, filed Nov. 10, 2017; U.S. Application No. 62/584,435, filed Nov. 10, 2017; U.S. Application No. 62/555,002, filed Sep. 6, 2017; U.S. Application No. 62/555,174, filed Sep. 7, 2017; U.S. Application No. 62/555,014, filed Sep. 6, 2017; U.S. Application No. 62/555,177, filed Sep. 7, 2017; U.S. Application No. 62/510,664, filed May 24, 2017, the entire contents of each of which is hereby expressly incorporated herein by reference.

TECHNICAL FIELD

Systems and methods are disclosed with respect to using a blockchain for managing and resolving subrogation payments involving an insured loss with arbitration.

BACKGROUND

When an insured person suffers a covered loss, an insurer may pay costs to the insured person and pursue subrogation from another party involved in the loss. For example, if an insured vehicle is involved in a collision and suffers a loss, the insurer may compensate the vehicle owner according to an insurance agreement. If, for example, the vehicle owner was not at fault in the collision, the insurer may pursue damages from another party, such as the insurer of the party who was at fault in the collision. An insurance agreement may include an obligation of an insured to assign the insured's claim against a party at fault to the insurer, who may then collect on the claim on the insured's behalf.

Settling a subrogation payment may be a lengthy, complicated process. The various parties (e.g., parties at fault in a vehicle collision, owners of the vehicles, insurers, etc.) may need to exchange information relating to the collision to determine which party was at fault. Sources of information relevant to a fault information and/or subrogation payment include information regarding parties involved in a loss, forensic data regarding the loss, vehicle data regarding a loss, etc. The various parties must verify and share information from a variety of sources, including information held by parties involved in a loss and their insurers and information obtained from third parties (e.g., governmental entities, independent contractors, etc.).

The parties to a subrogation payment (e.g., insurers) may make proposals to one another to settle the subrogation claim. A proposal may include an accounting of damages, such as the costs to a vehicle owner whose vehicle was damaged. If an insured person suffered an injury in a collision, the injured person's health care costs may be included in the accounting of damages. One or both of the parties to a subrogation claim may rely on independent third parties to assess costs, such as a repair cost estimate by an authorized automotive repair services provider for damage incurred in a collision. To settle the subrogation claim, the parties must indicate acceptance or approval of damages calculations and a payment amount that is agreed between the parties to settle the claim. Parties may rely on a third-party intermediary to handle subrogation negotiations and resolution (e.g., validate information relating to a loss and facilitating communications between the insurers) at added expense.

If the parties to the subrogation claim cannot settle the claim themselves, then the dispute may be decided in other ways. For example, the parties may submit the claim to arbitration before an arbitrator. The parties may agree to arbitrate the dispute based upon qualifications of the arbitrator (e.g., membership in a professional arbitration association). An arbitrator may request information from the parties, decide disputes between the parties on issues of damages calculations and damages liability. In some cases, the parties to the subrogation claim may withdraw from arbitration and seek resolution of the subrogation claim in another forum such as in a court of law.

BRIEF SUMMARY

A shared ledger operated by a group of network participants according to a set of consensus rules manages and resolves subrogation claims between a clamant and a defendant with arbitration. Evidence regarding the value of the subrogation claim is sent to the shared ledger by the parties to the subrogation claim, such as sending data to a smart contract deployed on the shared ledger. The parties to the claim may request arbitration, especially after attempts to settle the claim on-chain between the two parties have failed. An arbitrator may request evidence from the parties and/or request responses from the parties to accept damages calculations and/or settlement offers. Once the claim is resolved, the arbitrator may release funds on the chain to the prevailing party or may accept confirmation that any payments have been made between the parties off-chain.

In one aspect, a computer-implemented method of settling a subrogation claim by a shared ledger may be provided. The method may include, via one or more processors, servers, and/or transceivers: (1) paying a claim to an insured for an insured loss; (2) generating an electronic subrogation claim; (3) deploying the electronic subrogation claim to a shared ledger, the subrogation claim: (a) identifying a subrogation defendant, (b) including information regarding the insured loss, and/or (c) including a demand to arbitrate the electronic subrogation claim; (4) broadcasting an update to the electronic subrogation claim deployed to the shared ledger; and/or (5) receiving an electronic subrogation claim settlement payment upon resolution of the subrogation claim to facilitate settling a subrogration. The method may include additional, less, or alternate actions, including those discussed elsewhere herein.

In another aspect, a validating network node on a shared ledger network may be provided. The node may include (1) a transceiver configured to exchange shared ledger data with peer network nodes, the shared ledger data including subrogation claim transactions including demands for arbitration; (2) a storage media configured to store a copy of the shared ledger; and/or (3) a transaction validator configured to apply a set of consensus rules to shared ledger data received from the peer network nodes, the transaction validator being further configured to append shared ledger data received from peer nodes to the copy of the shared ledger if the shared ledger data satisfies the consensus rules. The node may include additional, less, or alternate functionality, including that discussed elsewhere herein.

In another aspect, a computer-implemented method of settling a subrogation claim by a shared ledger may be provided. The method may include, via one or more processors, servers, and/or transceivers: (1) monitoring a blockchain for an indication of a subrogation claim, the subrogation claim identifying: (a) a subrogation claimant, (b) including evidence regarding an insured loss, and (c) including a demand to arbitrate the subrogation claim; (2) determining whether the evidence regarding the insured loss satisfies an acceptance condition; (3) broadcasting to a blockchain network an indication of acceptance of the evidence regarding the insured loss if the evidence regarding the insured loss satisfies the acceptance condition; and/or (4) remitting a payment to the subrogation claimant in settlement of the subrogation claim. The method may include additional, less, or alternate actions, including those discussed elsewhere herein.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein:

FIG. 5 depicts an exemplary smart contract state in a shared ledger network for resolving subrogation claims with arbitration, in accordance with one aspect of the present disclosure.

FIG. 6 depicts an exemplary transaction on a shared ledger network for resolving subrogation claims, in accordance with one aspect of the present disclosure.

FIG. 7 depicts an exemplary transaction on a shared ledger for resolving subrogation claims with arbitration associated with one aspect of the present disclosure.

FIG. 13 depicts an exemplary flow diagram for resolving a subrogation claim with arbitration in a shared ledger network associated with one aspect of the present disclosure.

Figure 1:
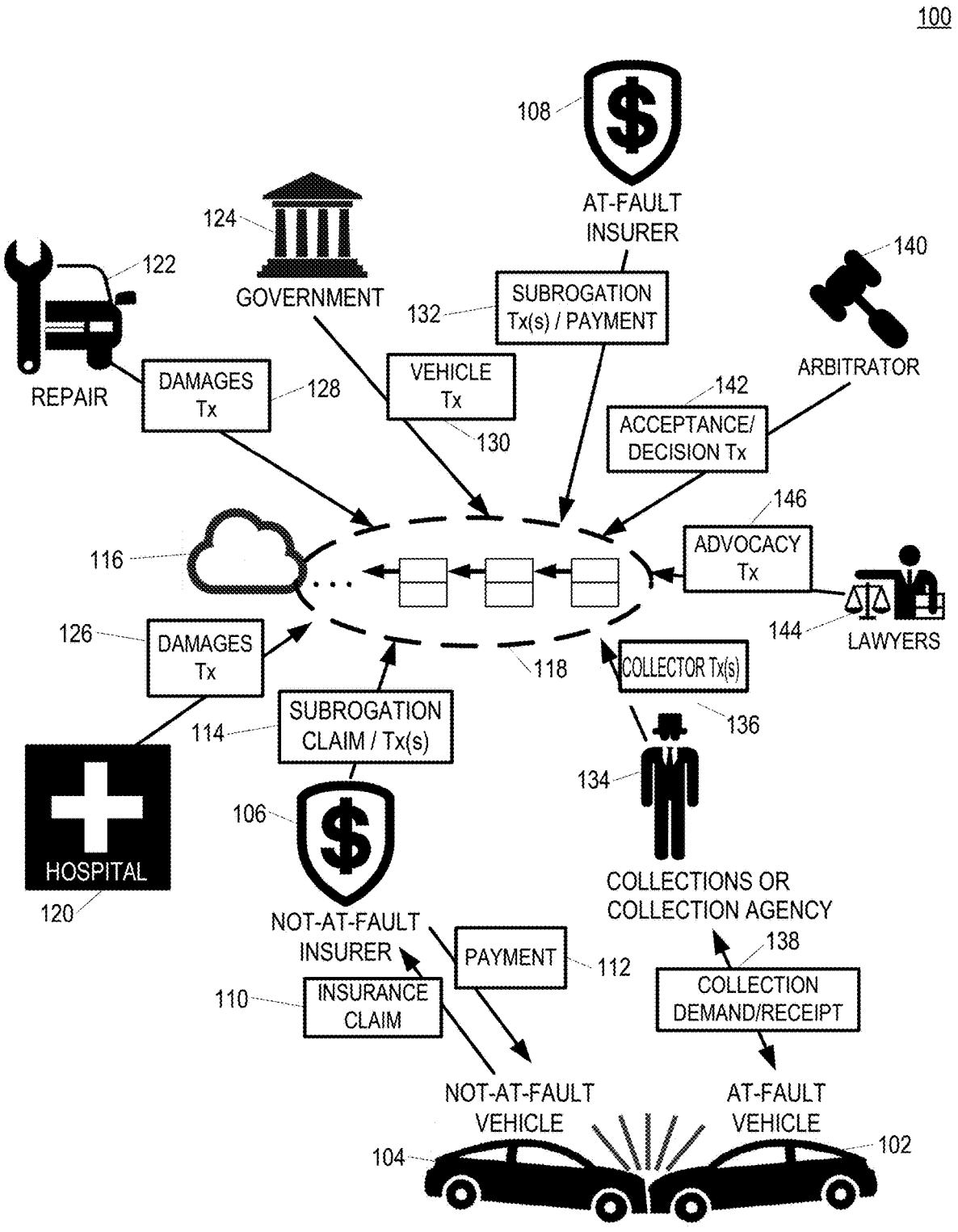
FIG. 1 is a schematic diagram of an exemplary shared ledger system for managing and resolving subrogation claims with arbitration, in accordance with one aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Traditionally, businesses, customers, and central authorities, such as those involved in a subrogation claim, have stored information related to transactions, and records of transactions, in databases or ledgers. Often these databases and ledgers are held by the participants and must be reconciled to achieve consensus as to the validity of the information stored therein. Alternatively, a central authority may be responsible for determining the validity of information stored in a database or a ledger and functioning as an arbiter of consensus for interested parties, such as a recorder of deeds, an asset exchange, etc.

A blockchain (also referred to herein as a distributed ledger or a shared ledger) is a way of achieving a distributed consensus on the validity or invalidity of information in the chain. In other words, the blockchain provides a decentralized trust to participants and observers. As opposed to relying on a central authority, a blockchain is a decentralized database in which a transactional record of changes to the ledger is maintained and validated by each node of a peer-to-peer network. The distributed ledger is comprised of groupings of transactions organized together into a "block," and ordered sequentially (thus the term "blockchain"). Nodes may join and leave the blockchain network over time and may obtain blocks that were propagated while the node was gone from peer nodes. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the block-chain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirement and supply certain meta information regarding the change (e.g., blocks must be below a size limit, trans-actions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disre-garded by validating nodes that receive the change and is not propagated to other nodes. Accordingly, unlike a traditional system which uses a central authority, a single party cannot unilaterally alter the distributed ledger unless the single party can do so in a way that satisfies the consensus rules. The inability to modify past transactions leads to block-chains being generally described as trusted, secure, and immutable. Third party intermediaries who assist in the resolution of subrogation claims may thus be disintermedi-ated from the process by a decentralized blockchain.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

Blockchains may be deployed in a public, decentralized, and permissionless manner meaning that any party may view the shared ledger, submit new information to be added to the ledger, or join the network as a validating node. Other blockchains are private (e.g., permissioned ledgers) that keep chain data private among a group of entities authorized to participate in the blockchain network.

The present embodiments relate to systems and methods for using a blockchain to record and manage information related to resolution of a subrogation claim (e.g., a "subro-gation" blockchain). The subrogation blockchain may be either a public or permissioned ledger.

Exemplary Shared Ledger for Resolving Subrogation Claims With Arbitration

FIG. 1 depicts an exemplary shared ledger system 100 for resolving subrogation claims with arbitration in accordance with one aspect of the present disclosure. When an insured party, such as the owner of not-at-fault vehicle 104 experi-ences a covered loss, for example in a collision with at-fault vehicle 102, the owner of not-at-fault vehicle 104 may submit an insurance claim 110 to an insurer 106. The insurer 106 may have a contractual obligation to remit a payment 112 to the owner of the not-at-fault vehicle in exchange for assignment of any legal claim the owner of not-at-fault vehicle may have against the owner or operator of at-fault vehicle 102 for damage and expenses associated with the collision.

After insurer 106 has remitted payment 112 to the owner of the not-at-fault vehicle 104 and receive assignment of the vehicle owner's claim against the owner or operator of at-fault vehicle 102, the insurer 106 may initiate a process of managing and resolving the legal claim against the owner or operator of the at-fault vehicle 102 or against an insurer 108 of the at-fault vehicle (e.g., a subrogation claim). The shared ledger system 100 includes a blockchain 118 accessible by network participants via a network 116 (e.g., a private or public packet switched network). To begin the blockchain subrogation claim resolution process, the insurer 106 broad-casts a subrogation claim or transaction 114 to the block-chain 118.

The blockchain 118 may be a network wherein partici-pating network nodes validate changes to a shared ledger based upon transactions broadcast by other network partici-pants. The transaction 114, and other transactions disclosed herein, may include information relating to the subrogation claim that may be modified by subsequent transactions broadcast over the network 116. In another implementation, validators on the blockchain 118 are configured to maintain a state database and execute code in smart contracts deployed by network participants.

A smart contract on the blockchain 118 may expose methods and maintain the state of data relating to a subro-gation claim by the insurer 106 against the insurer 108 relating to an insured loss covered by the insurer 106. Methods of the smart contact may be public methods available to be called by any of the network participants. Alternatively or additionally, methods of a smart contract on the blockchain 118 may include private methods that may only be called by certain parties. A smart contract on the blockchain 118 may have a contract owner who may estab-lish and/or alter the smart contract. A smart contract owner may assign permissions to certain network participants.

After a subrogation claim 114 has been lodged by insurer 106, information relating to the covered loss may be col-lected by other parties that were involved in the collision to evaluate the subrogation claim. For example, a hospital 120 may broadcast a damages transaction 126 to the blockchain 118 that includes evidence of medical bills incurred as part of the collision. An automotive services repair provider 122 may broadcast a transaction 128 to supply information regarding repair services estimated or rendered as a result of the collision. A government entity 124 may supply evidence relating to the collision in vehicle transaction 130. Vehicle transaction 130 may include information relating to one or more of the vehicles 102 and 104 involved in the collision relevant to the subrogation claim (e.g., registration status, registered owner, legal title information, police reports regarding the collision, driving records of the drivers involved in the collision, lien information regarding the vehicles 102 and 104, etc.).

When entities broadcast transactions to the blockchain 118 to initiate or add data to a subrogation claim, the transactions may be accompanied by a proof-of-identity of the entity broadcasting the transaction. In one implementa-tion, a cryptographic proof-of-identity is included in trans-actions sent to the blockchain. For example, each of the entities 106, 108, 120, 122, and 124 may own private cryptographic keys that are associated with public cryptographic keys known to belong to the entity (e.g., public cryptographic keys associated with each of the entities may be published by a trusted third party or proven to other network participants, etc.) An entity wishing to broadcast a transaction to the blockchain 118 may sign a cryptographic message in the transaction with the entity's private cryptographic key to prove the identity of the entity broadcasting the transaction. In this way, other network participants may be provided with cryptographic proof that the information contained in the broadcast transaction was originated by the participating entity.

After entities such as the hospital 120, automotive repair services provider 122, government agency 124, etc. have supplied information relevant to the subrogation claim, the subrogation claim defendant insurer 108 may broadcast one or more subrogation transactions 132 to the blockchain 118 to indicate acceptance or rejection of the various components of the subrogation claim. For example, if the subrogation claim defendant 108 disputes that medical care provided by the hospital 120 was caused by the collision, and thus would form a proper basis for liability to the subrogation claimant insurer 106, the subrogation defendant insurer 108 may broadcast a transaction marking the damages transaction 126 as disputed or not agreed. In response, the insurer 106 may broadcast a transaction 114 to respond to the subrogation defendant 108's rejection, such as lowering the damages claimed as part of the medical costs incurred at the hospital 120, adding more evidence of the nature of the medical services rendered by the hospital 120, etc.

If the subrogation defendant insurer 108 accepts the damages associated with the subrogation claim brought by the claimant insurer 106, the subrogation defendant insurer 108 may broadcast a transaction 132 to the blockchain 118 to indicate a resolution of the subrogation claim for the amount reflected by the blockchain 118. Alternatively, or additionally, the subrogation defendant insurer 108 may broadcast a transaction to the blockchain 118 reflecting payment of the subrogation claim and/or may broadcast a transaction sending a token having value that circulates on the blockchain 118 to the insurer claimant 106.

One or more of the parties to the subrogation claim (e.g., the insurers, the parties to the loss, etc.) may demand resolution of the subrogation claim by a third party. One example of a third party who may resolve the subrogation claim on the blockchain 118 is an arbitrator 140. The arbitrator 140 may become involved in resolving the subrogation claim in any of several ways. In one implementation, the subrogation claim or transactions 114 broadcast to the network by the subrogation claimant 106 may include an arbitration demand. In other implementations, the subrogation defendant 108 may issue an arbitration demand in its subrogation transactions 132. The parties to the subrogation claim may first attempt to resolve the dispute without arbitration, and may only demand arbitration if the claim fails to resolve. The parties may instead demand arbitration before attempting to resolve the dispute on the blockchain 118 without arbitration.

An arbitration demand may be accepted by the arbitrator 140 on-chain by broadcasting an acceptance/decision transaction 142. The acceptance/decision transaction 142 may mark the subrogation claim as accepted by the arbitrator 140 and therefore no longer in a pool of available arbitration cases on the chain 118. In some implementations, the subrogation claim on the chain 118 (e.g., a smart contract representing the claim, a set of related transactions in an UTXO model chain, etc.) is also accepted by the parties to the claim as indicated by acceptance transactions (e.g., after the arbitrator 140 has cleared a conflict check or otherwise approved by the parties). An arbitration demand on the chain 118 may include a demand for an arbitrator who holds a qualification issued by a professional organization, who holds a membership in a professional society or organization, is whitelisted by the parties, or who holds a credential for deciding disputes in arbitration. In this manner, arbitrators 140 may perform freelance work. The arbitrators may accept any arbitration demands broadcasted to the network, as opposed to conventional systems where arbitrators may be employed by a particular insurer to hear non-party cases. For example, as a member of an arbitration group, an insurer may be expected to provide an arbitrator to hear a non-party case each time the insurer submits a party case to arbitration and obtains an arbitrator from another insurer which is not a party to the arbitration for the submitted case.

Once an arbitrator 140 has accepted an arbitration demand, the arbitrator 140 may broadcast additional transactions 142 to the blockchain 118 to establish a schedule for the arbitration, to request evidence from the parties, to request damages and/or liability calculations, to request acceptance of damages and/or liability calculations, to request counter-proposals to damages and/or liability, to request settlement proposals and/or acceptance, etc. The parties may broadcast transactions to the blockchain 118 to indicate their proposals, acceptance/rejection, etc. of the requests by the arbitrator. In one implementation, the transactions broadcast by the parties to the subrogation claim and/or the arbitrator include sending data to a smart contract on the blockchain 118. For example, the transactions may include sending a zero amount of a token on the chain to the smart contract to call functions on the smart contract. Functions on the smart contract may allow the parties to flip flags, set data, and perform changes to the state data of the contract that represents the subrogation claim.

In some implementations, arbitration does not successfully resolve a subrogation claim between the parties. As such, one of the parties may withdraw from arbitration by broadcasting a subrogation transaction indicating the withdrawal. In some implementations, any smart contract state from the on-chain arbitration proceedings is preserved for future dispute resolution (e.g., evidence introduced, positions taken, calculations proposed/accepted, etc.) because it resides on the immutable blockchain 118.

In some implementations, parties may indicate lawyers 144 are desired to advance the subrogation claim, such as in a court of law for example. If a party to the subrogation claim desires involvement of lawyers it may be indicated on the blockchain 118 by sending data to a smart contract (e.g., to flip a flag in the smart contract state indicating interest, by adding a transaction to a UTXO model chain that indicates the interest and association with the subrogation claim, etc.). Lawyers 144 may monitor the blockchain 118 for available cases. If a lawyer 144 notices an available subrogation claim, the lawyer 144 may examine data already on-chain to evaluate the merits of the claim and to decide whether the lawyer 144 should take the case.

Another third party that may be involved in the subrogation claim on the blockchain 118 are collections, or collection agencies 134. Upon resolution of a claim, the prevailing party may experience difficulty in collecting any judgment owed. As such, the prevailing party may indicate interest in collection services from collections, or collection agencies 134 in much the same way as the parties indicate desire for arbitration or for lawyers to take the case. A subrogation judgment may be assigned to the collections, or collection agency or collections, or the collection agency may charge a fee for the collection services rendered. The collections, or collection agency 134 may broadcast collection transactions 136 to the blockchain 118 to indicate status of collection on judgments from the at-fault party 102 and/or the at-fault insurer 108.

Figure 2:
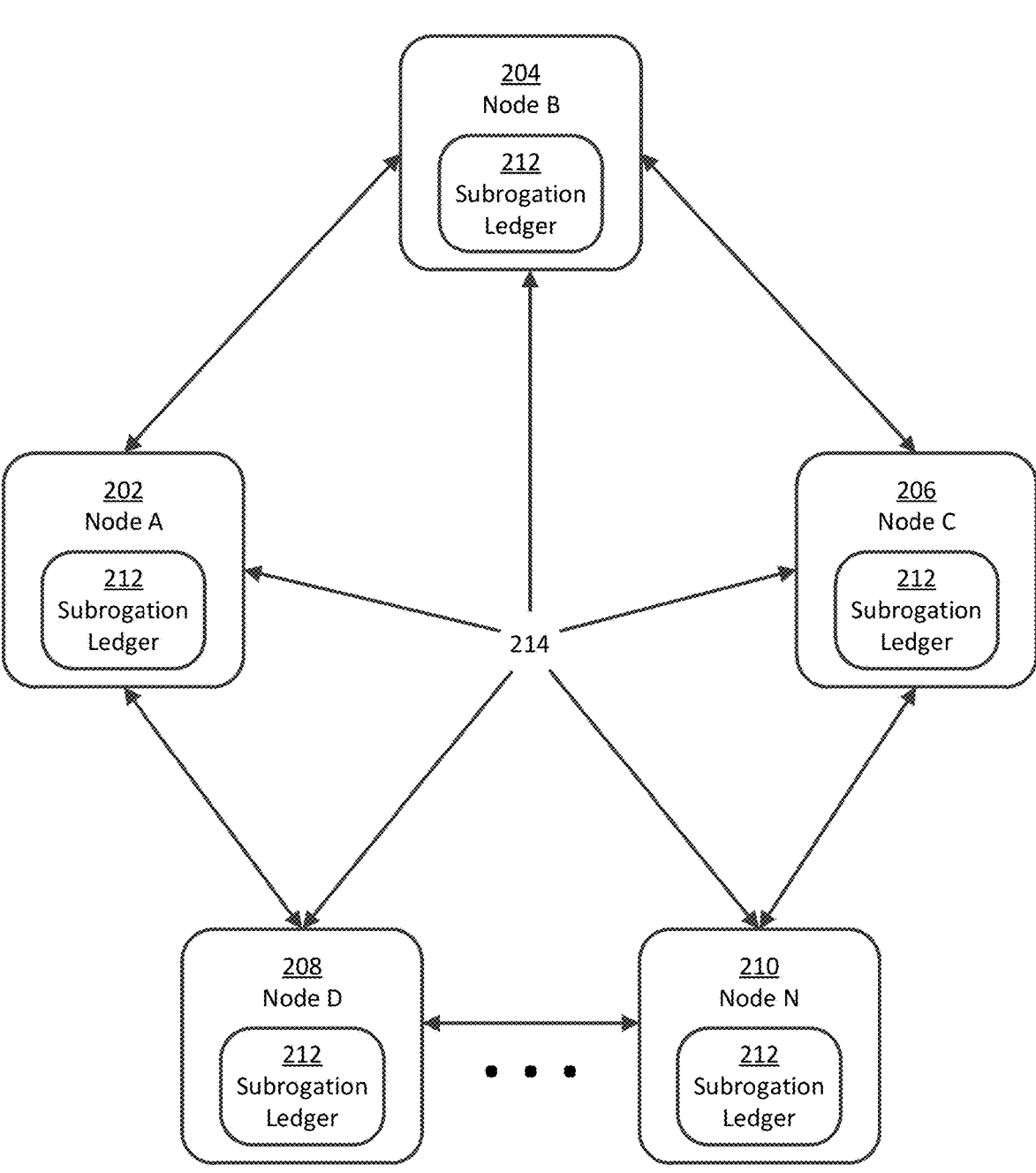
FIG. 2 depicts an exemplary shared ledger system for resolving subrogation claims with arbitration, in accordance with one aspect of the present disclosure.

Exemplary Validating Nodes in a Distributed Ledger System for Resolving Subrogation Claims FIG. 2 depicts an exemplary shared ledger system 200 for resolving subrogation claims with arbitration in accordance with one aspect of the present disclosure. The system 200 includes a shared subrogation ledger 212 and plurality of nodes 202, 204, 206, 208, and 210. Each node maintains a copy of the subrogation ledger 212. As changes are made to the subrogation ledger 212, each node received the change via network 214 updates its respective copy of the shared subrogation ledger 212. A consensus mechanism may be used by the nodes 202-210 in the shared ledger system 200 to decide whether it is appropriate to make received changes to the subrogation ledger 212.

Each node in the system therefore has its own copy of the subrogation ledger 212, which is identical to every other copy of the subrogation ledger 212 stored by the other nodes. The shared ledger system 200 is more robust than a central authority database system because of the shared ledger's decentralized nature. As such, there is no single point of failure on the shared ledger system 200 as there would be in a centralized system.

Exemplary Transaction Flow & Block Propagation Flow

Figure 3:
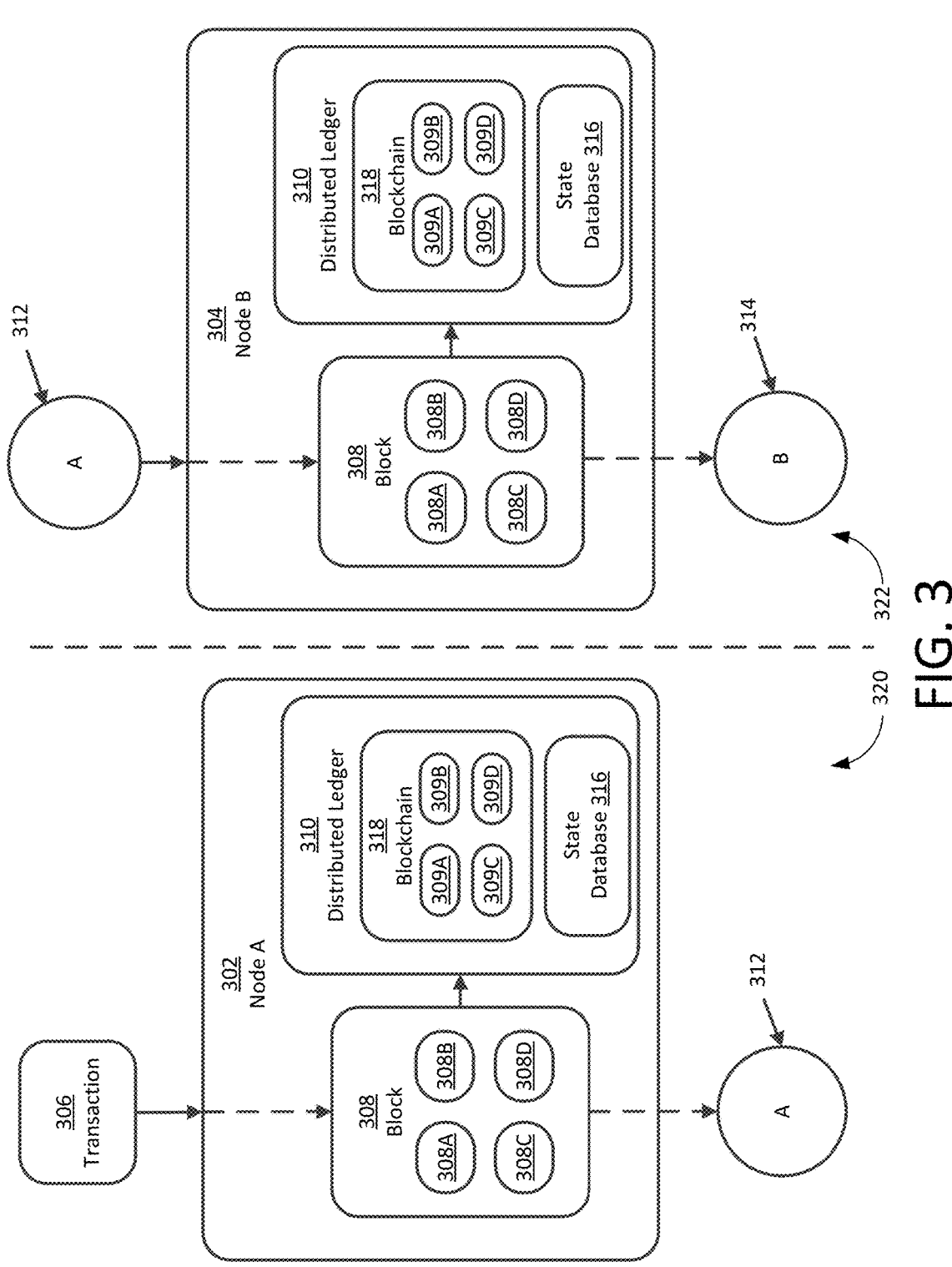
FIG. 3 depicts exemplary validating network nodes and an exemplary transaction flow on a shared ledger network for resolving subrogation claims with arbitration, in accordance with one aspect of the present disclosure.

FIG. 3 depicts exemplary validating network nodes and an exemplary transaction flow 300 on a shared ledger network for resolving subrogation claims with arbitration in accordance with one aspect of the present disclosure. FIG. 3 includes two time frames 320 and 322 represented by the left and right sides of the dotted line, respectively, Node A 302 and Node B 304, a set of transactions 308A-308D, a set of blocks of transactions 309A-309D, a distributed ledger 310, and a blockchain 318.

The block propagation flow 300 may begin with Node A 302 receiving transaction 306 at time 320. When Node A 302 confirms that transaction 306 is valid, the Node A 302 may add the transaction to a newly generated block 308. As part of adding the transaction 306 to block 308, Node A 302 may solve a cryptographic puzzle and include the solution in the newly generated block 308 as proof of the work done to generate the block 308. In other embodiments, the transaction 306 may be added to a pool of transactions until a sufficient number of transactions in the pool exist to form a block. Node A 302 may transmit the newly created block 308 to the network at 312. Before or after propagating the block 308, Node A 302 may add the block 308 to its copy of the blockchain 318.

The transactions 309A-309D may include updates to a state database 316. The state database 316 may contain current values of variables created by smart contracts deployed on the blockchain 318. Validated blocks such as block 308 may include transactions affecting state variables in state database 316. At time 322 Node B 304 may receive the newly created block 308 via the network at 312. Node B 304 may verify that the block of transactions 308 is valid by checking the solution to the cryptographic puzzle provided in the block 308. If the solution is accurate then Node B 304 may add the block 308 to its blockchain 318 and make any updates to the state database 316 as rejected by the transactions in block 308. Node B 304 may then transmit the block 308 to the rest of the network at 314.

Exemplary Node

Figure 4:
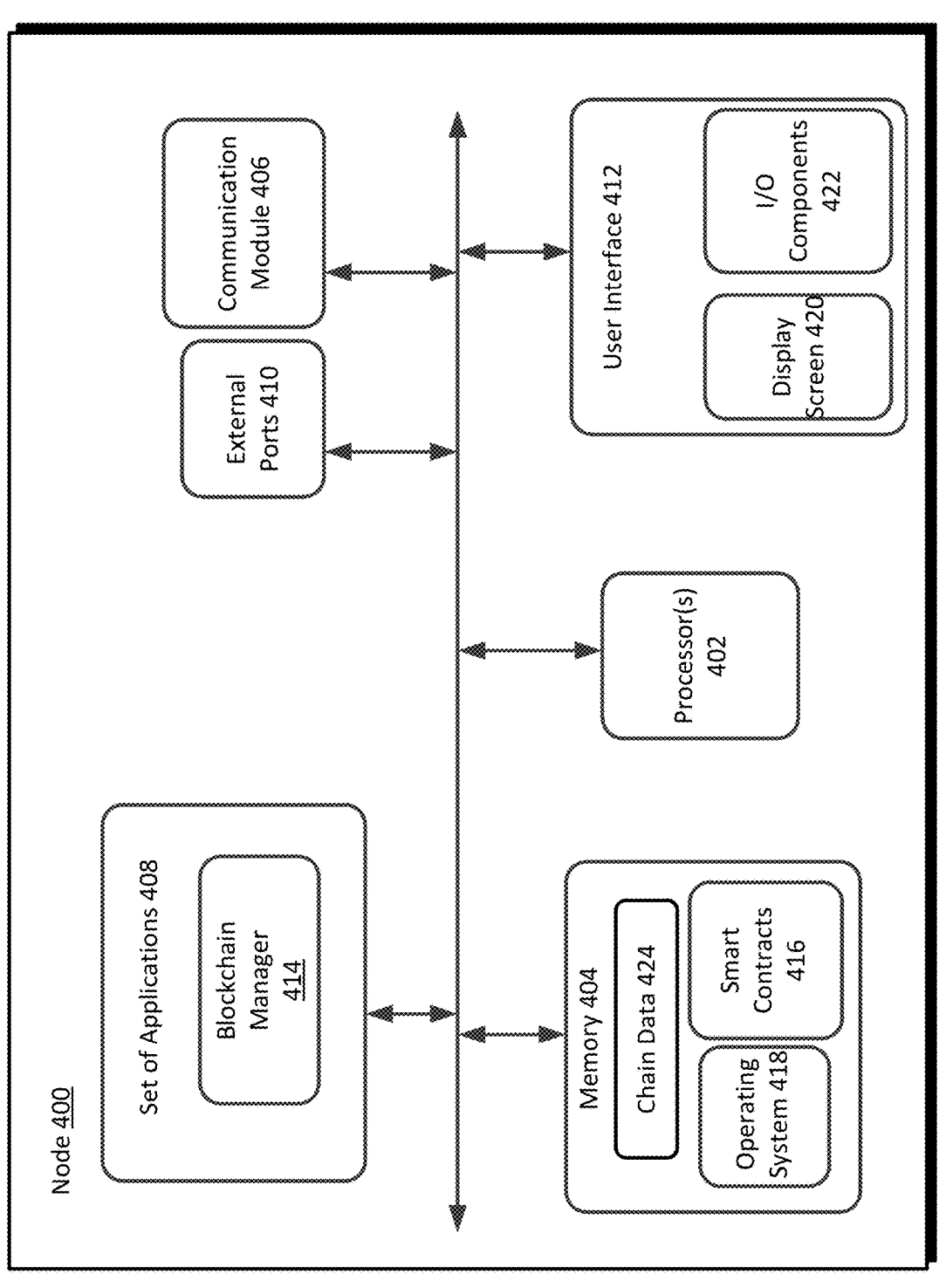
FIG. 4 depicts exemplary components of a network node on a shared ledger network for resolving subrogation claims with arbitration, in accordance with one aspect of the present disclosure.

FIG. 4 depicts exemplary components of a network node 400 on a shared ledger network for resolving subrogation claims with arbitration in accordance with one aspect of the present disclosure. Node 400 is capable of performing the functionality disclosed herein. Node 400 may include at least one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions or may broadcast transactions to other network nodes by using the blockchain manager 414. Similarly, the node 400 may use the blockchain manager 414 in conjunction with the smart contracts 416 stored in memory 404 to execute the functionality disclosed herein. The memory 404 may further include chain data 424 including, for example, a state database of the blockchain for storing state of smart contracts deployed thereon.

In other embodiments, the smart contracts 416 operate independent of the blockchain manager 414 or other applications. In some embodiments, node 400 does not have a blockchain manager 414, or smart contracts 416 stored at the node. In some embodiments, the node 400 may have additional or less components than what is described. The components of the node 400 are described in more detail below.

The node 400, as part of a decentralized ledger system 112, or another decentralized or centralized network, may be used as part of systems that interact with and/or manipulate data and transactions associated with the automotive claims process, the vehicle loss history process, and/or the vehicle identification number lifecycle process.

Exemplary Smart Contract State

FIG. 5 depicts an exemplary smart contract state 500 in a shared ledger network for resolving subrogation claims with arbitration in accordance with one aspect of the present disclosure. A smart contract may be deployed by any participant in the subrogation blockchain network (e.g., a subrogation claimant) to establish a contract state 506 for a particular subrogation claim. The deployed smart contract may expose methods and data to other participants in the subrogation blockchain network. Some of the data in the smart contract state may be private data that may only be altered by calling a method of the smart contract or only altered by authorized blockchain participants.

One way of altering the smart contract state 506 is to broadcast a transaction to the subrogation blockchain 502. If the broadcast transaction satisfies consensus rules, network validators may include the transaction in a block 504. Inclusion in the blockchain 502 of a transaction sending data to the smart contract may cause validating nodes to update a state database, thus allowing network participants access to a rich state mechanism to manage the subrogation process and ultimately to resolve the subrogation claim.

Subrogation smart contract state 506 may include pieces of data to identify and track the subrogation claim. For example, a contract owner may select a unique ID for the subrogation claim such that subsequent transactions and data sent to the smart contract can identify the contract by ID number. The contract owner may also specify an identity of the subrogation claimant and defendant. In at least one implementation, the subrogation claimant and defendant are identified by cryptographic public keys assigned to the respective entities. Subsequent data sent to the smart contract may include a message signed by private keys corresponding to the public keys identifying the subrogation claimant and defendant in the smart contract, thus providing cryptographic proof that the transaction was originated by one of the parties to the dispute. The private and public keys may be managed solely by the parties to minimize the attack surface for any attackers that might attempt to forge a transaction (e.g., the parties generate public/private cryptographic key pairs offline and only provide the public key to other network participants). A party's private keys may be generated according to a securely stored seed value (e.g., on a piece of physical paper or multiple copies of a piece of paper) such that the private keys may be recovered in the case of a data loss.

The smart contract state 506 may further include information regarding the basis of the subrogation claim such as the policy holder and a description of the damages suffered (e.g., date, time, place, etc.). A subrogation blockchain network participant may monitor the blockchain 502 for any subrogation claims that identify the participant as a subrogation defendant. As such, it is not necessary for a subrogation claimant to notify a subrogation defendant "off-chain" of the existence of the claim. A subrogation claimant may additionally make such a notification to the subrogation defendant as a redundant communication.

Resolving a subrogation claim may require assembling evidence of the damages suffered by a policy holder. The evidence could take the form of expert or witness statements (e.g., a statement from a treating doctor that an injury and/or medical care was the result of a collision, statement of a witness to a collision tending to establish the fault of the subrogation defendant's insured vehicle driver, etc.). The evidence could also take the form of documentary evidence (e.g., report from an authorized automotive repair services provider of damage to a vehicle as the result of a collision, a repair estimate, a repair bill for repair services rendered, a certification from a government entity that a vehicle involved in a collision had a valid registration, an appraisal, etc.).

As evidence regarding the subrogation claim is collected from the various entities involved (medical, auto repair, governmental, etc.), these entities may broadcast transactions to the blockchain 502 to reflect the status of the loss and to provide the evidence therefor to other network participants, specifically the subrogation claimant and defendant. For example, a doctor who treated a patient for injuries sustained in a collision may broadcast a transaction sending data to the smart contract to connect the patient's injuries to the collision. The evidence may take the form of a cryptographically signed statement from the doctor attesting to the injuries. The evidence could take the form of a digitized X-ray or other medical record tending to prove the existence of an injury. The evidence could further take the form of medical bills issued by the hospital for services rendered for the injuries. Like the subrogation claimant and defendant, a doctor or hospital may own a private cryptographic key that corresponds to a public cryptographic key known to belong to the hospital or doctor by the other network participants. By signing any submitted evidence with the private cryptographic key, the hospital or doctor may provide cryptographic proof of identity to the subrogation defendant that the evidence was truly submitted by the doctor or hospital. A subrogation defendant may choose to rely solely on the cryptographic proof offered by the doctor/hospital without separately contacting the doctor/hospital to verify the data. In this way, the blockchain 502 reduces time and cost associated with resolving a subrogation claim.

The subrogation defendant may also submit comments in response to the evidence by broadcasting transactions to the blockchain 502. Additionally, the subrogation claimant may submit comments in response to the subrogation defendant's comments by broadcasting transactions to the blockchain 502 and the subrogation defendant and claimant may have a discussion back and forth that is broadcasted to the blockchain 502. The comments that form the discussion back and forth may be stored as part of the smart contract state data for recordkeeping purposes.

Another aspect of the subrogation smart contract state 506 associated with a subrogation claim is the smart contract data. Smart contract data may be thought of like the private and public data in an object created according to an object-oriented programming paradigm in that they may be directly updated from outside the object or they may be updated only in limited ways, such as by calling a method of the smart contract. In at least one implementation, smart contract data includes an indication (e.g., a flag) as to whether the parties to the subrogation claim accept evidence in the smart contract as representative of the damages owed by the subrogation defendant. These flags may be set according to methods in the smart contract that require the caller to prove its identity. The method may only permit, for example, a subrogation defendant to set a flag indicating the subrogation defendant's acceptance of a component of the damages of the subrogation claim. For example, once sufficient evidence relating to the cost of a medical treatment has been included in the smart contract, a subrogation claimant may indicate its approval of the evidence by setting a flag.

A subrogation defendant, upon review of the medical evidence, may choose to either set its corresponding flag to indicate its acceptance of the medical evidence or it may decline to do so if it disputes the veracity of the evidence. As such, the smart contract state tracks the various components of the damages owed and refines points of dispute for the parties to the subrogation claim. When all sources of evidence for the value of the subrogation claim have been approved by the subrogation claimant and defendant, the value of the claim has been determined and agreed upon, and a subrogation defendant may mark the settlement as agreed by sending data to the smart contract. Additionally, the subrogation defendant may mark the settlement as paid. In at least one implementation, the blockchain 502 includes a circulating token having value with which the subrogation defendant may pay the subrogation claimant.

The smart contract data may also include an indication (e.g., a flag) as to whether each of the parties to the subrogation claim have provided an offer or a counter-offer and the corresponding amount of the offer or counter-offer. These flags may be set according to methods in the smart contract that require the caller to prove its identity. The method may only permit, for example, the opposing party to set a flag indicating the opposing party's counter-offer and the amount of the counter-offer. For example, when the subrogation defendant submits an offer only the subrogation claimant may set a flag indicating a counter-offer and the amount of the counter-offer. When the subrogation defendant or claimant accepts the latest offer or counter-offer, the settlement may be marked as agreed for the latest offer or counter-offer amount. The offers and counter-offers that represent the negotiation back and forth may be stored as part of the smart contract state data for recordkeeping purposes.

The smart contract data may also be used to make an arbitration demand. In one implementation, a party may send data to the smart contract to alter a smart contract state including an arbitration flag. The flag may be set to true to indicate a desire for arbitration. In other implementations, other data structures may be used to indicate a desire for arbitration such as a list that may include more information than a simple arbitration demand as depicted in FIG. 5. For example, the list may include requirements of the arbitrator such as qualifications, a whitelist of approved arbitrators, conditions of the arbitration (e.g., evidence rules, time frame, cost, damages caps, etc.).

In some implementation, the block of transactions 504 may organize the transactions it has received into a Merkle Tree to facilitate access to the stored transactions. The transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the root of the tree, or the node at the top of the tree, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. For example, vehicle telematics data tending to show which vehicle was at fault in a collision may be uploaded by the vehicle to the blockchain 502 contemporaneously with or subsequent to a collision. Only a cryptographic hash of the data may be included in the blockchain 502 such that the data may be verified using the blockchain even if it is obtained by a party off-chain.

Validating network nodes may verify that the signed transaction or signed message was signed by the private cryptographic key corresponding to the published public cryptographic key owned by the authorized vehicle manufacturer. In at least one implementation, a valid proof-of-identity may be applied as a consensus rule by the blockchain network. As such, any transaction attempting to add a new VIN number to the blockchain without a cryptographic proof-of-identity matching an identity authorized to add a new VIN number is rejected by the network as non-compliant with the consensus rule.

Exemplary Subrogation Evidence Transactions

FIG. 6 depicts an exemplary transaction 600 on a shared ledger network for resolving subrogation claims with arbitration in accordance with one aspect of the present disclosure. The transaction 600 may modify a prior transaction or it may send data to a smart contract deployed on the blockchain 602. An originator of the transaction 600 may broadcast the transaction to nodes on the blockchain network and the transaction 600 will be included in block 604 if it is a valid transaction. The transaction 600 may include various information regarding the transaction's changes to the subrogation claim managed by the blockchain 602. For example, the transaction 600 may include the unique subrogation contract ID, the originator of the transaction, a description of the damages, and data including evidence of the damages suffered.

After a collision, a repair facility typically takes control of the vehicle. In some cases the repair facility may provide a rental car, or substitute transportation to the vehicle owner. The repair facility secures authorization to repair the vehicle from the vehicle owner. Once this is secured, the repair facility identifies potential areas of prior damage/betterment, develops a repair plan, and prepares a repair estimate. The repair facility may request parts from suppliers, finalize any parts orders, update the estimate accordingly, and generally manage the repair of the vehicle. As part of the repair process, the repair facility may provide photographic evidence of the damage done to the vehicle. These photographs may then be uploaded to the blockchain after they have been hashed so as to ensure that any private information is protected, but also that the photographs provided are valid.

Evidence of the damage done to the vehicle may also be provided from evidence oracles 608. These evidence oracles may be devices connected to the internet that record information about the physical environment around them. For example, the evidence oracles may be connected video cameras, traffic cameras, road sensors, motion sensors, environmental conditions sensors (e.g., measuring atmospheric pressure, humidity, etc.) as well as other Internet of Things (IoT) devices. Evidence oracles 608 record information occurring in the physical world and may transmit that information to a distributed ledger where it can be used in the subrogation claims process. For example, an evidence oracle may collect data on a traffic intersection. This intersection may be of interest to insurers if it has a history for being a dangerous intersection where accidents frequently occur. The data may be packaged into a transaction, such as transaction 606. The data from the evidence oracle 608 may include a transaction ID, an originator (identified by a cryptographic proof-of-identity, and/or a unique oracle ID), an evidence type, such as video and audio evidence, and a cryptographic hash of the evidence. In another implementation, the evidence is not stored as a cryptographic hash, but is directly accessible in block 604 by an observer or other network participant, such as the participants in a subrogation claim.

Other examples of smart contract data added to the subrogation claim include arbitration schedule and/or arbitration decisions. An arbitration schedule may include deadlines for the parties to submit evidence, brief questions of law, bring or respond to filed motions, participate in conferences with the arbitrator, etc. The arbitration schedule need not be transmitted directly to the parties due to the blockchain's availability to the parties. The arbitrator may require the parties to monitor the subrogation claim state on the blockchain 602 to determine when the deadline exist. Another type of smart contract data is an arbitration decision. The arbitration decision may cover decisions on categories or calculations of damages, admission of evidence, settlement proposals, or the case as a whole.

FIG. 7 depicts an exemplary transaction 700 on a shared ledger network for resolving subrogation claims with arbitration in accordance with one aspect of the present disclosure. The transaction 700 may modify a prior transaction or it may send data to a smart contract deployed on the blockchain 702. An originator of the transaction 700 may broadcast the transaction to nodes on the blockchain network and the transaction 700 will be included in block 704 if it is a valid transaction. The transaction 700 may include various information regarding the transaction's changes to the subrogation claim managed by the blockchain 702. For example, the transaction 700 may include the unique subrogation contract ID, the originator of the transaction, and information relating to the subrogation claim. In the example illustrated in FIG. 7, the transaction 700 includes data relating to one of the vehicle involved in a collision. As such, the blockchain 702 will include evidence tending to show the value of the vehicle such as its make/model, year, color, options, etc. In one implementation, transaction 700 is broadcast by a government entity and includes data relating to the registration and insurance of the vehicle.

Figure 8:
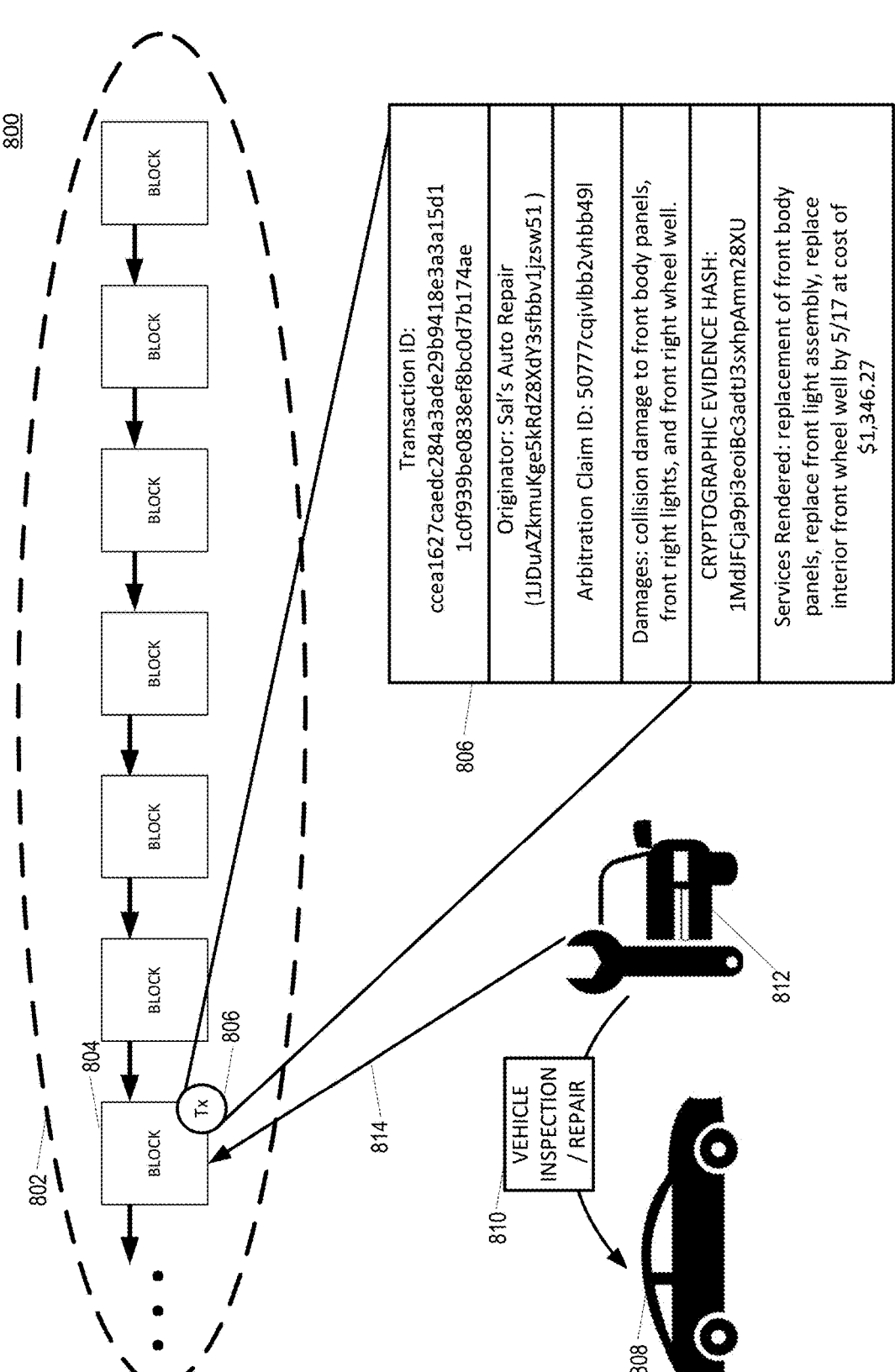
FIG. 8 depicts an exemplary transaction representing vehicle repair damages in a shared ledger network for resolving subrogation claims with arbitration associated with one aspect of the present disclosure.

One type of smart contract data shown in FIG. 8 includes the identity of a third party source of information. In the example illustrated in FIG. 8, new smart contract state data introduced by a new transaction includes information regarding the status of the vehicle. An identity of the entity supplying the status of the vehicle may be included in the smart contract (e.g., a governmental body, insurer, registrar, etc.).

FIG. 8 depicts an exemplary transaction 800 representing vehicle repair in a shared ledger network for resolving subrogation claims with arbitration associated with one aspect of the present disclosure. After a collision, a vehicle 808 that was involved in a collision is inspected/repaired 810 by an authorized repair facility 812. The authorized repair facility broadcasts transaction 806 to subrogation blockchain 802 to be included in a block, such as block 804. The transaction 806 includes data to update the state of the subrogation claim such as a transaction ID, an originator (identified by a cryptographic proof-of-identity, a unique subrogation arbitration claim ID, a description of damages, a cryptographic hash of damages evidence, and a description of services rendered and cost). In another implementation, the evidence is not stored as a cryptographic hash, but is directly accessible in block 804 by an observer or other network participant, such as the subrogation claim defendant. The transaction 800 may also include a smart contract data field to allow a subrogation claim defendant to indicate approval or rejection of the damages and evidence therefor.

Figure 9:
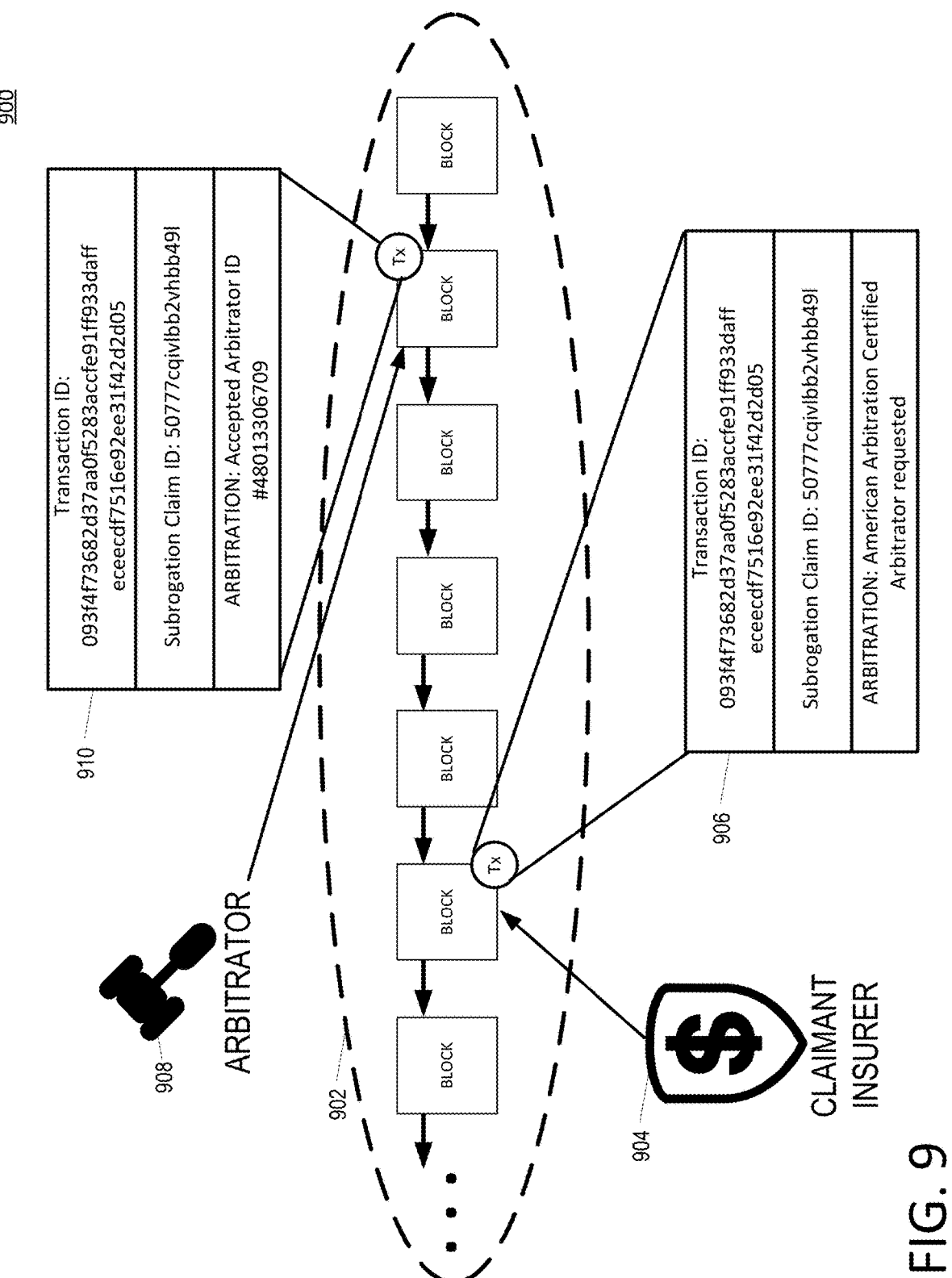
FIG. 9 depicts an exemplary transaction representing acceptance of a request for arbitration by an arbitrator in a shared ledger network for resolving subrogation claims with arbitration associated with one aspect of the present disclosure.

Exemplary Approval of an Arbitration Request Submitted by a Party to a Subrogation Claim on a Subrogation Blockchain FIG. 9 depicts an exemplary transaction 900 representing acceptance of an arbitration demand on a subrogation blockchain 902. A subrogation claimant insurer 904 broadcasts a transaction 906 to the blockchain 902 including an arbitration demand. In the example illustrated in FIG. 9, the arbitration demand in transaction 906 includes a qualification of the arbitrator. In a later transaction, the arbitrator 908 broadcasts a transaction 910 including an acceptance of the arbitration demand.

The arbitrator 908 may identify itself to the claimant insurer 904 and other parties to the subrogation claim in a number of ways. In one implementation, the arbitrator 908 is identified according to a public cryptographic key address on the blockchain 902. As such, the identity of the arbitrator may be determined off-chain such as if a professional association publishes a directory of public cryptographic key addresses of its members. In other implementations, the arbitrator 908 may cryptographically sign a message with a private key to provide a proof-of-identity to the participants. In yet other implementations, the arbitrator 908 may include a proof-of-identity in the transaction 910.

Figure 10:
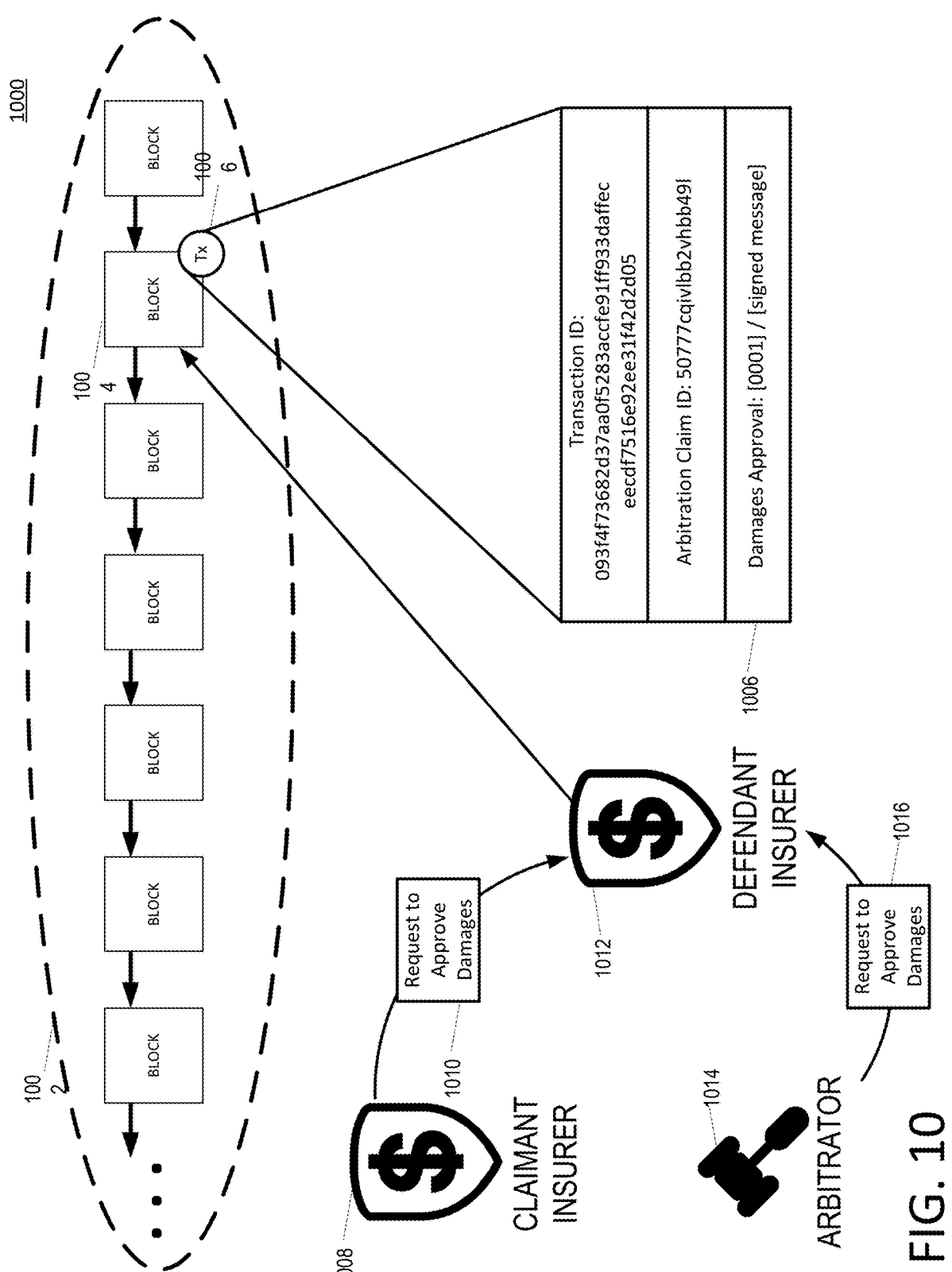
FIG. 10 depicts an exemplary transaction representing approval of damages by a subrogation claim defendant in a shared ledger network for resolving subrogation claims with arbitration associated with one aspect of the present disclosure.

Exemplary Request to Approve Damages by an Arbitrator on a Subrogation Blockchain FIG. 10 depicts an exemplary transaction 1000 representing a request to approve damages by a subrogation claim arbitrator in a shared ledger network for resolving subrogation claims with arbitration associated with one aspect of the present disclosure. When the shared ledger 1002 includes evidence of a component of damages of a subrogation claim, an arbitrator 1012 may request approval from one or both parties to the claim, the defendant insurer 1012 and/or the claimant insurer 1008. Such a request may be made on-chain or off. Due to the decentralized organization of the shared ledger 1002, the subrogation defendant need not respond directly to the claimant insurer 1008, but instead can simply broadcast a transaction 1006 to participants of the shared ledger network.

The requests 1010 and/or 1016 may apply to only a portion or component of a subrogation claim or it may apply to the claim as a whole. An approval transaction 1006 may include only a bare bones set of fields (e.g., transaction ID, subrogation claim ID, cryptographically signed message, crypto proof of identity, etc.) or other fields containing additional data may be included. In one implementation, a transaction 1006 approves components of a subrogation claim but rejects other components or does not express a position on other components. Components of a subrogation claim may be indexed to provide a reference for accepting/rejection positions (e.g., transaction 1006 includes an approval for a damages component indexed [0001]).

In one implementation, the transaction 1006 sends data to a smart contract deployed on blockchain 1002. The smart contract may include logic regarding the disbursal of funds when certain conditions are met. For example, network participants may agree that a subrogation claimant must post a bond before being allowed to lodge a subrogation complaint against another network participant. Control of the bond amount could be handled in different ways depending on the resolution of the claim. A bond paid into the smart contract by a subrogation claimant may be frozen until the resolution of the claim. The bond may be refundable to one or both parties depending on conditions specified in the smart contract. If a subrogation claimant opens a new case against a subrogation defendant and does not introduce any evidence during a time period, the bond may be refunded to the subrogation defendant. If a subrogation claim remains unresolved on the blockchain 1002 for over a timeout period (e.g., months or years), the bond may be returned to the subrogation claimant.

A smart contract holds and releases a bond or a settlement payment based upon a depositing transaction that turns over control of a token having value that circulates on the blockchain 1002. The token may be the unit of payment for validating nodes on the network of the blockchain 1002 (e.g., the validating nodes are executing smart contract code deployed by other network participants and are paid in a token). Alternatively, or additionally, the token may be a token itself issued by a smart contract and circulating on top of a base blockchain (e.g., a blockchain providing a virtual machine platform for smart contract execution). The value of the token may be free-floating against other crypto-tokens and/or fiat currencies against which it may be traded or the token may be a "stablecoin" pegged to a reference value (e.g., pegged to the U.S. Dollar, the Euro, the Yen, an ounce of gold, etc.). A subrogation smart contract may be programmed to hold and/or release the token under any conditions as may be desired by the network participants.

Exemplary Process Flow

Figure 11:
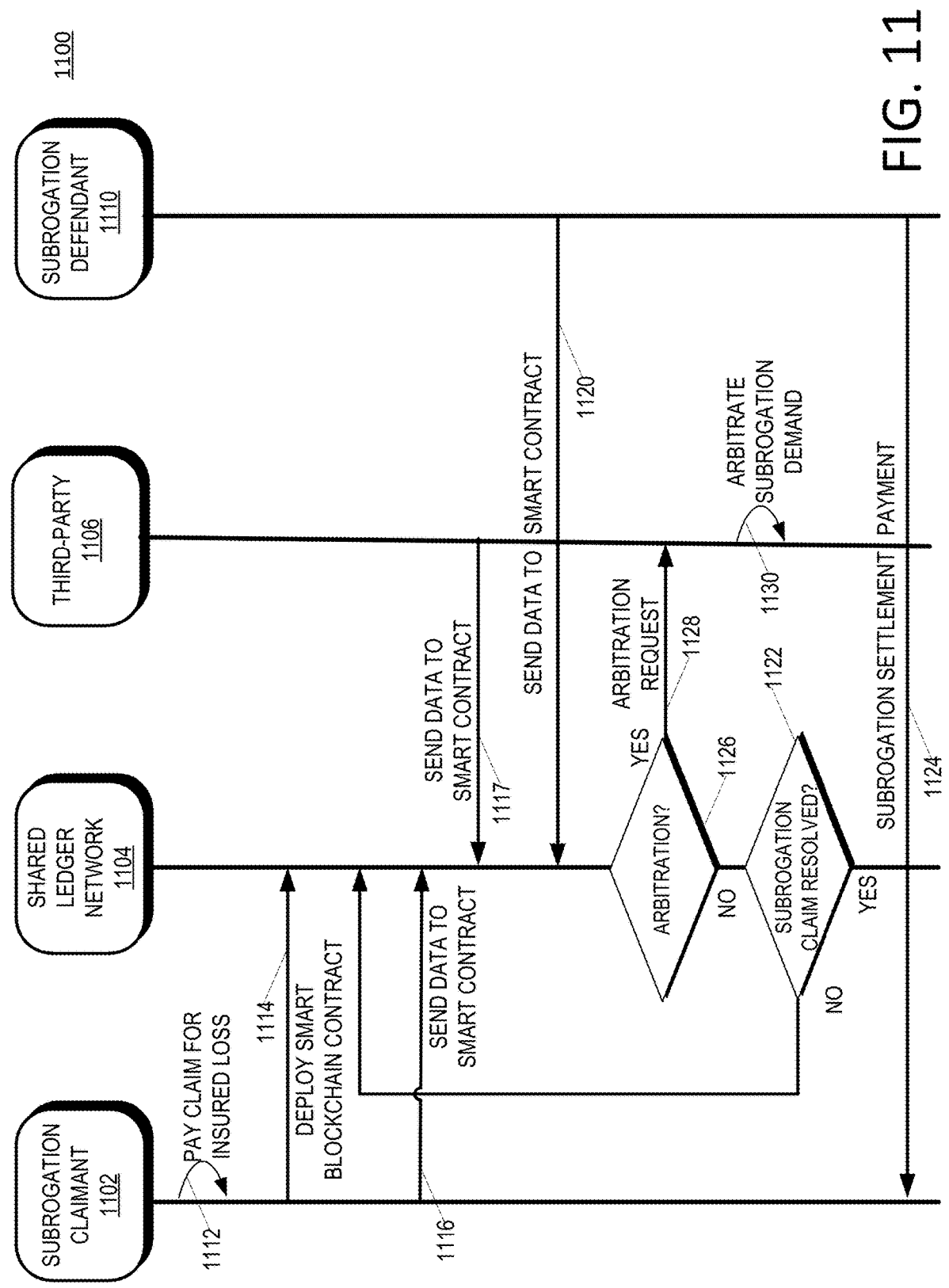
FIG. 11 is a signal diagram of an exemplary process flow for resolving a subrogation claim with arbitration in a shared ledger network associated with one aspect of the present disclosure.

FIG. 11 is a signal diagram 1100 of an exemplary process flow for resolving a subrogation claim in a shared ledger network associated with one aspect of the present disclosure. When a subrogation claimant pays 1102 an insured loss (1112) on a loss for which the subrogation claimant's insured was not at fault, the subrogation claimant 1102 deploys a smart contract 1114 to a shared ledger network 1104 for resolving subrogation claims. Operation 1114 may include depositing a bond with the smart contact in a token having value such that the rules of the smart contract determine when and to whom the bond will be released depending on the outcome of the subrogation claim (or lack of resolution of the subrogation claim). The subrogation sends data to the smart contract (1116) either as part of operation 1114 or separately to populate the smart contract with information pertaining to the subrogation claim.

Third parties 1106 send data to the smart contract (1017) to supply evidence of the claimed loss. The information may include estimates of repair to covered property that was at-loss or for repairs that had already occurred and costs that had already been incurred (e.g., auto repairs, temporary transportation expense, etc.). The transaction 1117 may include a cryptographic proof of identity of the third party 1106 such that only trusted entities may supply data to the shared ledger network 1104. Operation 1117 repeats with different third parties 1106 until no more third parties 1106 add data to the shared ledger 1104.

Third parties may also include autonomous sources. Devices that have networking connectivity may detect the occurrence of a loss and may report loss data to other third parties 1106 or directly to the blockchain. In one implementation, a vehicle includes sensor data that can detect when a collision has occurred (e.g., airbag deployed, crash codes reported by on-board electronics, etc.). The vehicle may autonomously transmit the data to the blockchain or to other third parties who may, in turn, send the data to the blockchain. The vehicle data may be sent automatically upon detection of a collision and it may be signed with a cryptographic key on the vehicle that cryptographically proves the data originated with the vehicle that was involved in the collision. Due to the immutable nature of a blockchain, autonomous uploading of vehicle crash sensor data also cryptographically proves the time at which the data existed. For example, if vehicle crash sensor data becomes part of a shared ledger as of a certain time and date, it proves the information existed as of that time and date. If crash sensor data becomes part of the shared ledger with, for example, 10 minutes of a collision, then the blockchain proves the data existed as of 10 minutes after the collision. The parties to the subrogation claim may rely on the blockchain to provide evidence that the crash data was not manipulated or modified the closer in time the data was to the actual event which it describes.

A subrogation defendant 1110 sends data to the smart contract (1120) to indicate acceptance or rejection of the components of the subrogation claim and/or the entire claim. At block 1126, an arbitration request is made to a third party if one of the parties has demanded arbitration. The arbitration demand may be made on-chain by altering the state data of a smart contract associated with the subrogation claim. The subrogation claim is arbitrated at 1130 and, if the subrogation claim is settled (1122), the subrogation defendant makes a subrogation settlement payment (1124). If the subrogation claim is not successfully arbitrated at 1130, the work flow returns ("NO") at block 1122 to sending data to the smart contract.

Exemplary Shared Ledger Operations

Figure 12:
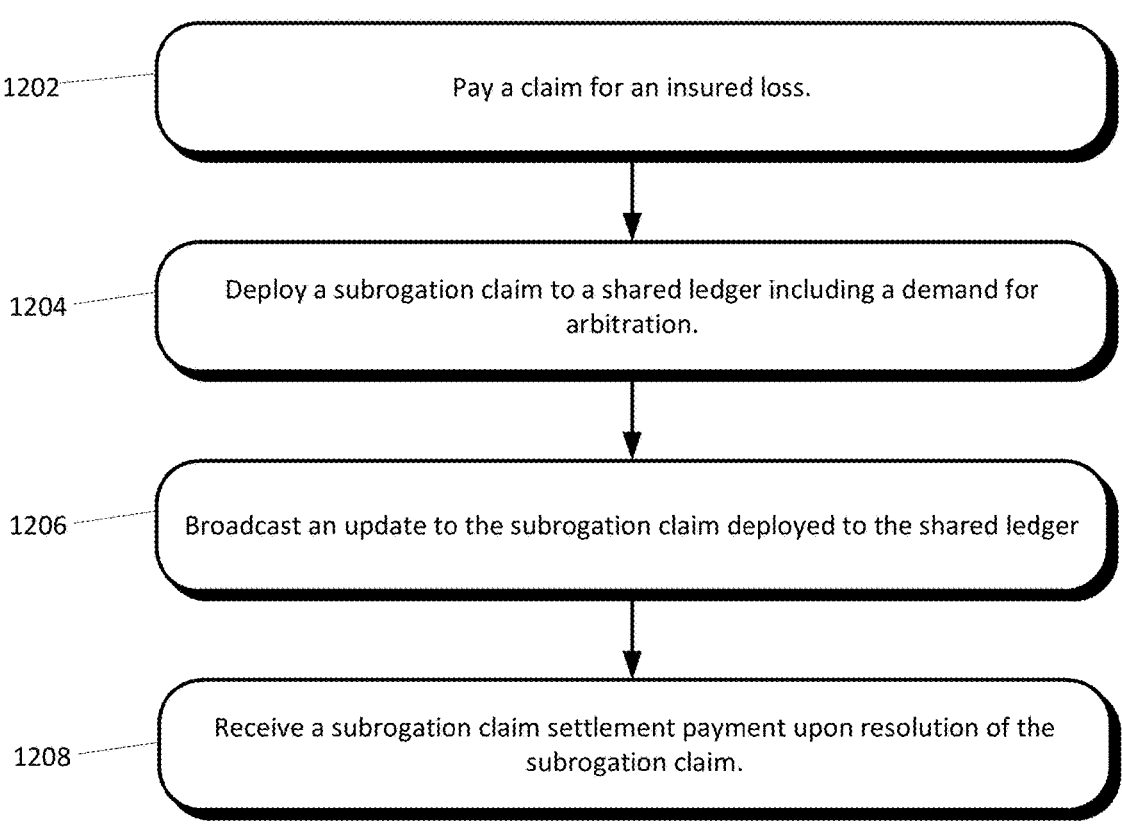
FIG. 12 depicts an exemplary flow diagram for resolving a subrogation claim with arbitration in a shared ledger network associated with one aspect of the present disclosure.

FIG. 12 depicts exemplary operations 1200 for resolving a subrogation claim in a shared ledger network associated with one aspect of the present disclosure. A payment operation 1202 pays a claim for an insured loss. If the entity that performs the payment operation 1202 believes it is entitled to a subrogation payment from another insurer because the other insurer's customer was at-fault in the event that caused the insured loss, then the entity that performs the payment operation 1202 deploys a subrogation claim including a demand for arbitration to a shared ledger (1204). The deploying operation 1204 may include broadcasting a transaction to a shared ledger network identifying the subrogation defendant or the deploying operation 1104 may include deploying a smart contract to a shared ledger to manage and resolve the subrogation claim.

A broadcasting operation 1206 broadcasts an update to the subrogation claim deployed to the shared ledger. The broadcasting operation 1206 may initiate components of the subrogation claim such as damages incurred in various areas. The broadcasting operation 1206 may be part of the deploying operation 1204 or the broadcasting operation may be a separate operation. A receiving operation 1208 receives a subrogation claim settlement payment upon resolution of the subrogation claim. The subrogation claim settlement payment may be disbursed according to the rules of a smart contract deployed on the blockchain.

FIG. 13 depicts exemplary operations 1300 for resolving a subrogation claim in a shared ledger network associated with one aspect of the present disclosure. A monitoring operation 1302 monitors a blockchain for an indication of a subrogation claim. The monitoring operation may be performed by a potential subrogation claim defendant, or it may be performed by an independent entity on behalf of a subrogation claim defendant. In one implementation, insurers are subject to a common blockchain agreement that obligates the insurers to periodically check the blockchain for any pending claims against the insurer, such as subrogation claims.

A determining operation 1304 determines whether evidence regarding an insured loss that is the subject of the subrogation claim satisfies an acceptance condition. An acceptance condition may depend on factors such as whether the evidence regarding the loss was supplied by a cryptographically-proven trusted third party (e.g., an authorized vehicle repair services provider, a licensed medical practitioner, a government entity tasked with supplying information, etc.), whether fault of the insured is shown, whether the subrogation defendant considers the category of damages appropriate for subrogation liability, etc.

A broadcasting operation 1306 broadcasts to a blockchain network an indication of acceptance of the evidence regarding the insured loss if the evidence satisfies the acceptance condition. In one implementation, the broadcasting operation 1306 broadcasts a transaction that modified a portion of the ledger representing the subrogation claim. A cryptographically signed message may be included in the transaction signifying the acceptance. In another implementation, the broadcasting operation 1306 sends data to a smart contract deployed on the blockchain, the data sent to the smart contract indicating the acceptance of the evidence. A remitting operation 1310 remits a payment to the subrogation claimant in settlement of the subrogation claim. The remitting operation 1310 may be made off-chain or it may involve transmitting a token having value on the blockchain. In at least one implementation, a smart contract is programmed to disburse the subrogation settlement claim to the subrogation claimant upon the satisfaction of certain conditions (e.g., the acceptance of the subrogation defendant).

Exemplary Computer-Implemented Methods for Settling a Subrogation Claim by a Shared Ledger In one aspect, a computer-implemented method of settling a subrogation claim by a shared ledger may be provided. The method may include, via one or more processors, servers, and/or associated transceivers: (1) paying a claim to an insured for an insured loss; (2) generating and/or deploying a subrogation claim to a shared ledger including a demand for arbitration (such as by transmitting the subrogation claim via wireless communication or data transmission over one or more radio frequency links or communication channels), the subrogation claim identifying a subrogation defendant and including information regarding the insured loss; (3) broadcasting an update to the subrogation claim deployed to the shared ledger (such as via wireless communication or data transmission over one or more radio frequency links or communication channels); and/or (4) receiving (such as via wireless communication or data transmission over one or more radio frequency links or communication channels) a subrogation claim settlement payment upon resolution of the subrogation claim. The method may include additional, less, or alternate actions, including those discussed elsewhere herein.

In another aspect, a computer-implemented method of settling a subrogation claim by a shared ledger may be provided. The method may include, via one or more processors, servers, and/or associated transceivers: (1) paying a claim to an insured for an insured loss; (2) generating a subrogation claim, the subrogation claim including a demand for arbitration and identifying a subrogation defendant and including information regarding the insured loss; (3) transmitting or otherwise deploying the subrogation claim to a shared ledger; (4) broadcasting an update to the subrogation claim deployed to the shared ledger; and/or (5) receiving a subrogation claim settlement payment upon resolution of the subrogation claim. The method may include additional, less, or alternate actions, including those discussed elsewhere herein.

In another aspect, a computer-implemented method of settling a subrogation claim by a shared ledger may be provided. The method may include, via one or more processors, servers, and/or transceivers: (1) monitoring a blockchain for an indication of a subrogation claim with a demand for arbitration, the subrogation claim identifying a subrogation claimant and including evidence regarding an insured loss; (2) determining whether the evidence regarding the insured loss satisfies an acceptance condition; (3) broadcasting to a blockchain network an indication of acceptance of the evidence regarding the insured loss if the evidence regarding the insured loss satisfies the acceptance condition; and/or (4) remitting a payment to the subrogation claimant in settlement of the subrogation claim. The method may include additional, less, or alternate actions, including those discussed elsewhere herein.

In another aspect, a computer-implemented method of settling a subrogation claim by a shared ledger may be provided. The method may include, via one or more processors, servers, and/or associated transceivers: (1) monitoring a blockchain for an indication of a subrogation claim, the subrogation claim including a demand for arbitration and identifying a subrogation claimant and including evidence regarding an insured loss; (2) determining whether the evidence regarding the insured loss satisfies an acceptance condition; (3) generating an indication of acceptance of the evidence regarding the insured loss if the evidence regarding the insured loss satisfies the acceptance condition; (4) broadcasting (such as via wireless communication or data transmission over one or more radio frequency links or communication channels) to a blockchain network the indication of acceptance of the evidence; and/or (5) remitting a payment to the subrogation claimant in settlement of the subrogation claim. The method may include additional, less, or alternate actions, including those discussed elsewhere herein.

Exemplary Validating Network Node on a Shared Ledger

In one aspect, a validating network node on a shared ledger network may be provided. The node may include (1) a transceiver configured to exchange shared ledger data with peer network nodes, the shared ledger data including subrogation claim transactions including demands for arbitration; (2) a storage media configured to store a copy of the shared ledger; and/or (3) a transaction validator configured to apply a set of consensus rules to shared ledger data received from the peer network nodes, the transaction validator being further configured to append shared ledger data received from peer nodes to the copy of the shared ledger if the shared ledger data satisfies the consensus rules. The node may include additional, less, or alternate functionality, including that discussed elsewhere herein.

ADDITIONAL CONSIDERATIONS

This detailed description is to be construed as exemplary only and does not describe every possible embodiment, as describing every possible embodiment would be impractical, if not impossible. One may be implement numerous alternate embodiments, using either current technology or technology developed after the filing date of this application.

With the foregoing, a user may be an insurance customer who may opt-in to a rewards, insurance discount, or other type of program. After the insurance customer provides their affirmative consent, an insurance provider remote server may collect data from the customer's mobile device, smart home controller, smart or autonomous vehicle, or other smart devices—such as with the customer's permission or affirmative consent. The data collected may be related to smart home functionality (or home occupant preferences or preference profiles), smart or autonomous vehicle functionality, and/or insured assets before (and/or after) an insurance-related event, including those events discussed elsewhere herein. In return, risk adverse insureds, such as home or vehicle owners, or home, vehicle, or apartment occupants may receive discounts or insurance cost savings related to home, renters, personal articles, auto, mobile, and other types of insurance from the insurance provider.

In one aspect, smart or interconnected home data, autonomous or smart vehicle data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk adverse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants, or vehicle passengers.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The invention claimed is:

1. A validating network node on a shared ledger network for validating subrogation claim transactions comprising:

a transceiver configured to exchange shared ledger data with peer network nodes, the shared ledger data including subrogation claim transactions including demands for arbitration;

a storage media configured to store a copy of a shared ledger; and one or more processors configured to:

apply a set of consensus rules to the shared ledger data received from the peer network nodes;

append the shared ledger data received from the peer network nodes to the copy of the shared ledger if the shared ledger data satisfies the consensus rules; and execute a subrogation smart contract associated with a subrogation claim including a demand for arbitration of the subrogation claim, wherein the arbitration demand includes an identity of an arbitrator, the subrogation claim smart contract including a contract state and configured to obtain cryptographically signed evidence from participating entities, determine the cryptographically signed evidence is submitted by one of a plurality of predetermined participating entities, and determine that a transaction by the identified arbitrator includes a proof-of-identity to cryptographically prove that the transaction is submitted by the identified arbitrator.

2. The validating network node of claim 1, wherein the storage media is further configured to store a copy of a state database of the shared ledger.

3. The validating network node of claim 1, wherein the one or more processors are further configured to:

update a state of the subrogation smart contract.

4. The validating network node of claim 3, wherein the update to the state of the subrogation claim smart contract includes evidence of an insured loss and a proof-of-identity to cryptographically prove that the update is originated by a participating entity.

5. The validating network node of claim 3, wherein the subrogation smart contract further includes a subrogation defendant and a subrogation claimant.

6. The validating network node of claim 5, wherein the update to the state of the subrogation claim smart contract indicates that the subrogation defendant has accepted a settlement amount in response to the subrogation defendant providing an indication of acceptance of the settlement amount.

7. The validating network node of claim 5, wherein the update to the state of the subrogation claim smart contract includes a response to a request to accept a damages calculation from the arbitrator.

8. The validating network node of claim 5, wherein the update to the state of the subrogation claim smart contract includes medical evidence to prove an injury to the subrogation claimant.

9. The validating network node of claim 5, wherein the update to the state of the subrogation claim smart contract includes a settlement offer from the subrogation defendant.

10. The validating network node of claim 1, wherein the shared ledger data received from the peer network nodes includes a cryptographic hash value configured to validate off-chain evidence of an insured loss.

11. A computer-implemented method for validating subrogation claim transactions in a shared ledger network, the computer-implemented method comprising:

receiving, by one or more processors in a validating network node, shared ledger data from peer network nodes, the shared ledger data including subrogation claim transactions including demands for arbitration;

applying, by the one or more processors, a set of consensus rules to the shared ledger data received from the peer network nodes;

appending, by the one or more processors, the shared ledger data received from the peer network nodes to a copy of a shared ledger if the shared ledger data satisfies the consensus rules; and executing, by the one or more processors, a subrogation smart contract associated with a subrogation claim including a demand for arbitration of the subrogation claim, wherein the arbitration demand includes an identity of an arbitrator, the subrogation claim smart contract including a contract state and configured to obtain cryptographically signed evidence from participating entities, determine the cryptographically signed evidence is submitted by one of a plurality of predetermined participating entities, and determine that a transaction by the identified arbitrator includes a proof-of-identity to cryptographically prove that the transaction is submitted by the identified arbitrator.

12. The computer-implemented method of claim 11, further comprising:
   storing, by the one or more processors, a copy of a state database of the shared ledger.

13. The computer-implemented method of claim 11, further comprising:
   updating, by the one or more processors, a state of the subrogation smart contract.

14. The computer-implemented method of claim 13, wherein updating the state of the subrogation claim smart contract includes updating, by the one or more processors, the state of the subrogation claim smart contract with evidence of an insured loss and a proof-of-identity to cryptographically prove that the update is originated by a participating entity.

15. The computer-implemented method of claim 13, wherein the subrogation smart contract further includes a subrogation defendant and a subrogation claimant.

16. The computer-implemented method of claim 15, wherein updating the state of the subrogation claim smart contract includes updating, by the one or more processors, the state of the subrogation claim smart contract with an indication that the subrogation defendant has accepted a settlement amount in response to the subrogation defendant providing an indication of acceptance of the settlement amount.

17. The computer-implemented method of claim 15, wherein updating the state of the subrogation claim smart contract includes updating, by the one or more processors, the state of the subrogation claim smart contract with a response to a request to accept a damages calculation from the arbitrator.

18. The computer-implemented method of claim 15, wherein updating the state of the subrogation claim smart contract includes updating, by the one or more processors, the state of the subrogation claim smart contract with medical evidence to prove an injury to the subrogation claimant.

19. The computer-implemented method of claim 15, wherein updating the state of the subrogation claim smart contract includes updating, by the one or more processors, the state of the subrogation claim smart contract with a settlement offer from the subrogation defendant.

20. The computer-implemented method of claim 11, wherein the shared ledger data received from the peer network nodes includes a cryptographic hash value configured to validate off-chain evidence of an insured loss.

* * * * *